US010913291B2

United States Patent
Nishiura

(10) Patent No.: US 10,913,291 B2
(45) Date of Patent: Feb. 9, 2021

(54) STRUCTURE FORMING METHOD, STRUCTURE FORMING APPARATUS, STRUCTURE FORMING PROGRAM AND STRUCTURE FORMING PROCESSING MEDIUM

(71) Applicant: CASIO COMPUTER CO., LTD., Tokyo (JP)

(72) Inventor: Fusao Nishiura, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 342 days.

(21) Appl. No.: 15/777,346

(22) PCT Filed: Oct. 28, 2016

(86) PCT No.: PCT/JP2016/082898
§ 371 (c)(1),
(2) Date: May 18, 2018

(87) PCT Pub. No.: WO2017/086191
PCT Pub. Date: May 26, 2017

(65) Prior Publication Data
US 2020/0262217 A1    Aug. 20, 2020

(30) Foreign Application Priority Data

Nov. 18, 2015  (JP) .................................. 2015-225481
May 26, 2016  (JP) .................................. 2016-104772

(51) Int. Cl.
*B41J 11/00*    (2006.01)
*B41J 2/01*    (2006.01)
(Continued)

(52) U.S. Cl.
CPC ............... *B41J 11/002* (2013.01); *B41J 2/01* (2013.01); *B41J 3/407* (2013.01); *B41M 3/06* (2013.01); *B41M 7/009* (2013.01)

(58) Field of Classification Search
CPC ........... B41J 11/002; B41J 2/01; B41J 3/407; B41M 7/009; B41M 3/06
(Continued)

(56) References Cited

U.S. PATENT DOCUMENTS 8,870,327 B2   10/2014  Kanamura et al.
9,162,486 B2   10/2015  Motoyanagi
(Continued)

FOREIGN PATENT DOCUMENTS

JP    S56-144998 A    11/1981
JP    2001-150812 A    6/2001
(Continued)

OTHER PUBLICATIONS

International Search Report dated Jan. 31, 2017 issued in PCT/JP2016/082898.
(Continued)

*Primary Examiner* — Huan H Tran
*Assistant Examiner* — Alexander D Shenderov
(74) *Attorney, Agent, or Firm* — Scully Scott Murphy & Presser

(57) ABSTRACT

A structure forming method of present invention includes a first step including forming a first pattern serving as a fine pattern using an electromagnetic wave thermal conversion material on a first surface, on the side on which an expansion layer which expands by heating is provided, of a medium including the expansion layer and then irradiating an electromagnetic wave toward the electromagnetic wave thermal conversion material to expand a portion, corresponding to the first pattern, of the expansion layer, and a second step
(Continued)

including forming a second pattern including a coarser pattern than the first pattern using an electromagnetic wave thermal conversion material on a second surface, on the opposite side to the side on which the expansion layer is provided, of the medium and then irradiating an electromagnetic wave toward the electromagnetic wave thermal conversion material to expand a portion, corresponding to the second pattern, of the expansion layer.

18 Claims, 15 Drawing Sheets

(51) Int. Cl.
    *B41J 3/407*     (2006.01)
    *B41M 3/06*     (2006.01)
    *B41M 7/00*     (2006.01)

(58) Field of Classification Search
    USPC .......................................................... 347/102
    See application file for complete search history.

(56) References Cited

U.S. PATENT DOCUMENTS

| | | |
|---|---|---|
| 9,522,490 B2 | 12/2016 | Horiuchi et al. |
| 2012/0218338 A1 | 8/2012 | Kanamura et al. |
| 2013/0168903 A1* | 7/2013 | Horiuchi ............... B29C 44/022 |
| | | 264/413 |
| 2013/0280498 A1 | 10/2013 | Horiuchi et al. |
| 2015/0070452 A1 | 3/2015 | Motoyanagi |

FOREIGN PATENT DOCUMENTS

| | | |
|---|---|---|
| JP | 2012-171317 A | 9/2012 |
| JP | 2013-136171 A | 7/2013 |
| JP | 2014-083740 A | 5/2014 |
| JP | 2015-063130 A | 4/2015 |
| JP | 2015-071286 A | 4/2015 |
| JP | 2017-094706 A | 6/2017 |

OTHER PUBLICATIONS

Extended Supplementary European Search Report dated Apr. 11, 2019 in European Patent Application No. 16 86 6193.2.
Notice of Reasons for Refusal dated Jun. 9, 2020 received in Japanese Patent Application No. JP 2019-117296 together with an English language translation.

* cited by examiner

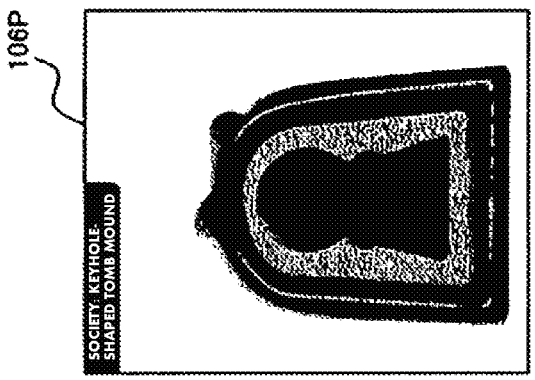
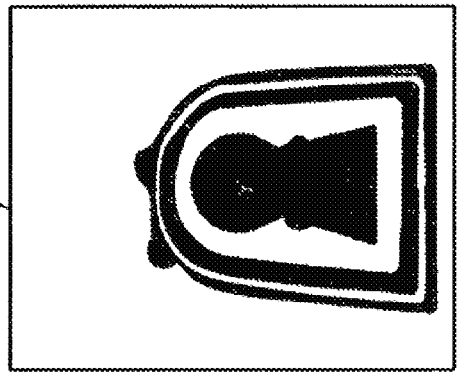
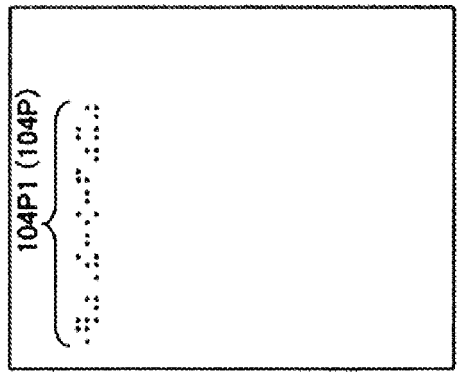

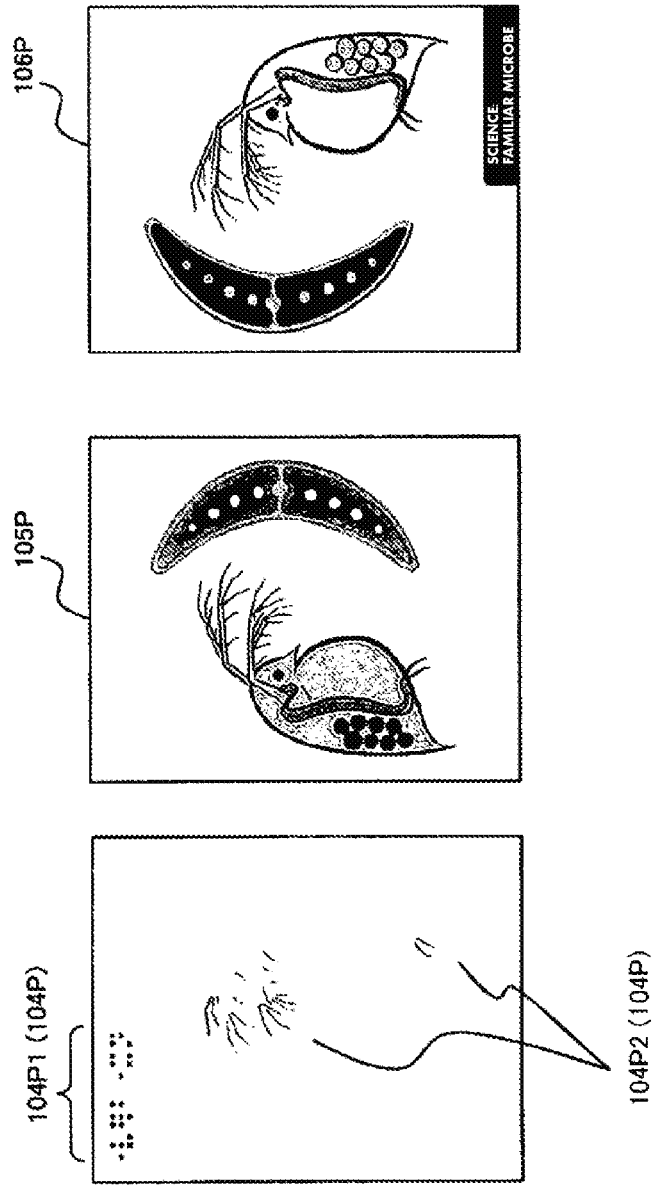

STRUCTURE FORMING METHOD, STRUCTURE FORMING APPARATUS, STRUCTURE FORMING PROGRAM AND STRUCTURE FORMING PROCESSING MEDIUM

CROSS-REFERENCE TO RELATED APPLICATIONS

This is a national stage of International Application No. PCT/JP2016/082898 filed Oct. 28, 2016, claiming priority based on Japanese Patent Applications No. 2015-225481, filed Nov. 18, 2015 and No. 2016-104772, filed May 26, 2016, the entire contents of which are incorporated herein by reference.

TECHNICAL FIELD

The present invention relates to a structure forming method, a structure forming apparatus, a structure forming program and a structure forming processing medium.

BACKGROUND ART

Conventionally, a foam molding method for forming a gray scale image to have a desired pattern on a surface, on the opposite side to the side on which an expansion layer which expands by heating is provided, of a medium including the expansion layer and irradiating the medium on which this gray scale image is formed with light from the opposite side thereto, to expand and raise a site, where the gray scale image is formed, of the expansion layer in the medium has been known (e.g., Patent Document 1). In Patent Document 1, the gray scale image absorbs light to generate heat, this heat is conducted to the expansion layer through a base material layer of the medium, and the expansion layer is expanded depending on an amount of the conducted heat.

PRIOR ART DOCUMENT

Patent Document

Patent Document 1: JP 2001-150812

SUMMARY OF INVENTION

Problem to be Solved by the Invention

However, a base material layer has a relatively large thickness. Thus, an amount of heat is easily dispersed in a planar direction of the base material layer while being conducted through the base material layer. Accordingly, there has been a problem that if a gray scale image having a fine pattern is formed on a surface on the opposite side of a medium, for example, irregularities faithfully corresponding to the gray scale image having such a pattern cannot be formed on the side, on which an expansion layer is provided, of the medium.

An issue of the present invention is to form first irregularities faithfully corresponding to a first pattern serving as a fine pattern and second irregularities corresponding to a second pattern serving as a coarser pattern than the first pattern are formed on the side, on which the expansion layer is provided, of the medium.

Means for Solving the Problem

A structure forming method according to the present invention includes a first step including forming a first pattern serving as a fine pattern using an electromagnetic wave thermal conversion material on a first surface, on the side on which an expansion layer which expands by heating is provided, of a medium including the expansion layer and then irradiating an electromagnetic wave toward the electromagnetic wave thermal conversion material to expand a portion, corresponding to the first pattern, of the expansion layer, and a second step including forming a second pattern including a coarser pattern than the first pattern using an electromagnetic wave thermal conversion material on a second surface, on the opposite side to the side on which the expansion layer is provided, of the medium and then irradiating an electromagnetic wave toward the electromagnetic wave thermal conversion material to expand a portion, corresponding to the second pattern, of the expansion layer.

A structure forming apparatus according to the present invention includes a forming unit which forms an electromagnetic wave thermal conversion material on an expansion layer, which expands by heating, in a medium including the expansion layer, an irradiation unit which irradiates an electromagnetic wave toward the electromagnetic wave thermal conversion material, to expand the expansion layer on which the electromagnetic wave thermal conversion material is formed, and a control unit which performs a first step of causing the forming unit to form a first pattern serving as a fine pattern using an electromagnetic wave thermal conversion material on a first surface, on the side on which the expansion layer is provided, of the medium and then causing the irradiation unit to expand a portion, corresponding to the first pattern, of the expansion layer, and a second step including causing the forming unit to form a second pattern including a coarser pattern than the first pattern using an electromagnetic wave thermal conversion material on a second surface, on the opposite side to the side on which the expansion layer is provided, of the medium, and then causing the irradiation unit to expand a portion, corresponding to the second pattern, of the expansion layer.

A structure forming program according to the present invention causes a control unit, in a structure forming apparatus including a forming unit which forms an electromagnetic wave thermal conversion material on an expansion layer, which expands by heating, in a medium including the expansion layer, an irradiation unit which irradiates an electromagnetic wave toward the electromagnetic wave thermal conversion material, to expand the expansion layer on which the electromagnetic wave thermal conversion material is formed, and a control unit which controls the forming unit and the irradiation unit, to perform a first step including causing the forming unit to form a first pattern serving as a fine pattern using an electromagnetic wave thermal conversion material on a first surface, on the side on which the expansion layer is provided, of the medium, and then causing the irradiation unit to expand a portion, corresponding to the first pattern, of the expansion layer, and a second step including causing the forming unit to form a second pattern including a coarser pattern than the first pattern using an electromagnetic wave thermal conversion material on a second surface, on the opposite side to the side on which the expansion layer is provided, of the medium, and then causing the irradiation unit to expand a portion, corresponding to the second pattern, of the expansion layer.

A structure forming processing medium according to the present invention is a medium including an expansion layer which expands by heating, in which an electromagnetic wave thermal conversion material is formed in a first pattern serving as a fine pattern on a first surface, on the side on which the expansion layer is provided, of the medium, and a thickness of a portion, corresponding to the first pattern, of the expansion layer is larger than a thickness of a remaining portion of the expansion layer.

Effect of the Invention

According to the present invention, first irregularities faithfully corresponding to a first pattern serving as a fine pattern and second irregularities corresponding to a second pattern serving as a coarser pattern than the first pattern can be formed on the side, on which an expansion layer is provided, of a medium.

BRIEF DESCRIPTION OF DRAWINGS

FIG. 3A to FIG. 3C are diagrams respectively depicting a plurality of images used to form a first structure.

FIG. 4A to FIG. 4C are diagrams respectively depicting a plurality of images used to form a second structure.

DESCRIPTION OF EMBODIMENTS

First Embodiment

FIG. 1A to FIG. 1D are cross-sectional views respectively depicting structure forming steps according to a first embodiment of the present invention.

Figure 2:
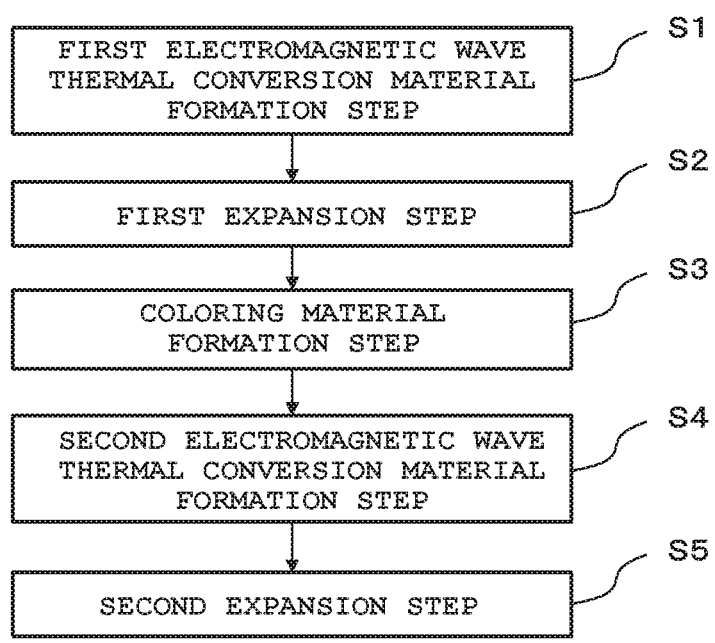
FIG. 2 is a flowchart for describing a structure forming method according to the first embodiment of the present invention.

FIG. 2 is a flowchart for describing a structure forming method according to the first embodiment of the present invention.

A method for forming structure forming processing media M12, M12', M12", and M14' and a structure M14' in the embodiment of the present invention will be described with reference to the drawings.

Note that in the present specification, a structure having irregularities formed on its surface by expanding an expansion layer 102, 102', and 102" in each of a medium M11 and the structure forming processing media M12, M12', M12", and M14' in at least its thickness direction is referred to as the structure M14".

[Structure Forming Processing Medium]

Figure 1A:
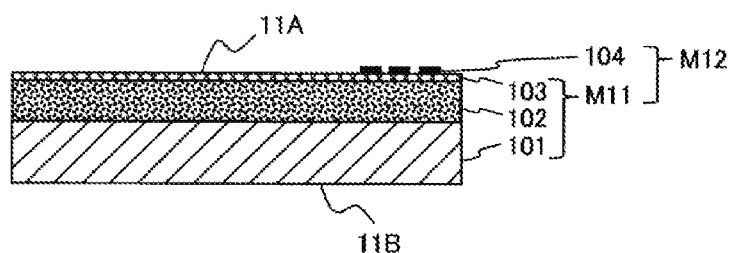
FIG. 1A to FIG. 1D are cross-sectional views respectively depicting structure forming steps according to a first embodiment of the present invention.

The structure forming processing medium (hereinafter merely referred to as "processing medium") M12 depicted in FIG. 1A is processed from the medium M11 in which a base material 101, the expansion layer 102, and an ink receiving layer 103 are stacked in this order, and is in a state before the expansion layer 102 is expanded by heating.

The medium M11 has its surface being flat before the expansion layer 102 is expanded by heating. Even if a layer is formed on the surface by printing, flatness of the surface is maintained as long as the expansion layer 102 is not expanded by heating.

In this specification, a surface of a medium being flat means that the surface of the medium is smooth or irregularities on the surface of the medium are small or few to such an extent that the original color tone of a printed product to be produced can be reproduced with a desired printing quality by printing using a general-purpose ink jet printer or laser printer designed on the premise that printing is performed on a print medium having a flat surface.

Also, when there are irregularities on a thickness in an ink discharge direction of a medium, i.e., on a surface of a medium regardless of fineness and a cross-sectional shape of the irregularities formed on the surface of the medium, it is said that the surface is flat if a thickness from a rear surface of the medium to a highest portion of the irregularities is 5 mm or less, for example.

The base material 101 is formed of paper, a cloth such as canvas, a panel material such as a plastic material, or the like, and its material quality is not particularly limited.

The expansion layer 102 is arranged with thermal foaming agents (heat-expandable microcapsules) dispersed within a binder serving as thermoplastic resin provided on the base material 101. Thus, the expansion layer 102 expands depending on an amount of absorbed heat (thermal energy).

The ink receiving layer 103 is formed to a thickness of 10 μm, for example, to cover an entire upper surface of the expansion layer 102.

As the ink receiving layer 103, a general-purpose ink receiving layer made of a material appropriate to receive and at least fix on its surface an ink for printing used for an ink jet printer, a toner for printing used for a laser printer, an ink for a ballpoint pen or a fountain pen, graphite for a pencil, or the like, and used for ink jet paper or the like can be used.

Note that an expansion layer is allowed to receive an ink by subjecting its surface to appropriate processing (e.g., processing for applying an ink receiving layer), and this expansion layer may be used as the expansion layer 102. In this case, the ink receiving layer 103 need not be provided.

Also, a binder material for the expansion layer 102 may be formed of a material capable of receiving ink. The ink receiving layer 103 is brought into a state where at least a part of its surface is exposed without being covered with a first electromagnetic wave thermal conversion material layer 104 and a coloring material layer 106, described below.

As a result, a message, a chart, a picture, or the like can be made easy to additionally record on an exposed portion on the surface of the ink receiving layer 103 using an ink and a toner for printing and other inks for writing materials.

If the ink receiving layer 103, the first electromagnetic wave thermal conversion material layer 104, and the coloring material layer 106 each have expandability, when the layers are deformed by following expansion of the expansion layer 102, clearances do not easily occur between the ink receiving layer 103 and the first electromagnetic wave thermal conversion material layer 104 and between the first electromagnetic thermal conversion material layer 104 and the coloring material layer 106.

If the clearances occur, an amount of heat conduction from the electromagnetic wave thermal conversion material layer 104 to the expansion layer 102, described below, may be suppressed. Thus, the ink receiving layer 103, the first electromagnetic wave thermal conversion material layer 104, and the coloring material layer 106 each desirably have relatively high expandability.

[Structure Forming Method]

A structure forming method according to the embodiment will be described below.

Figure 7:
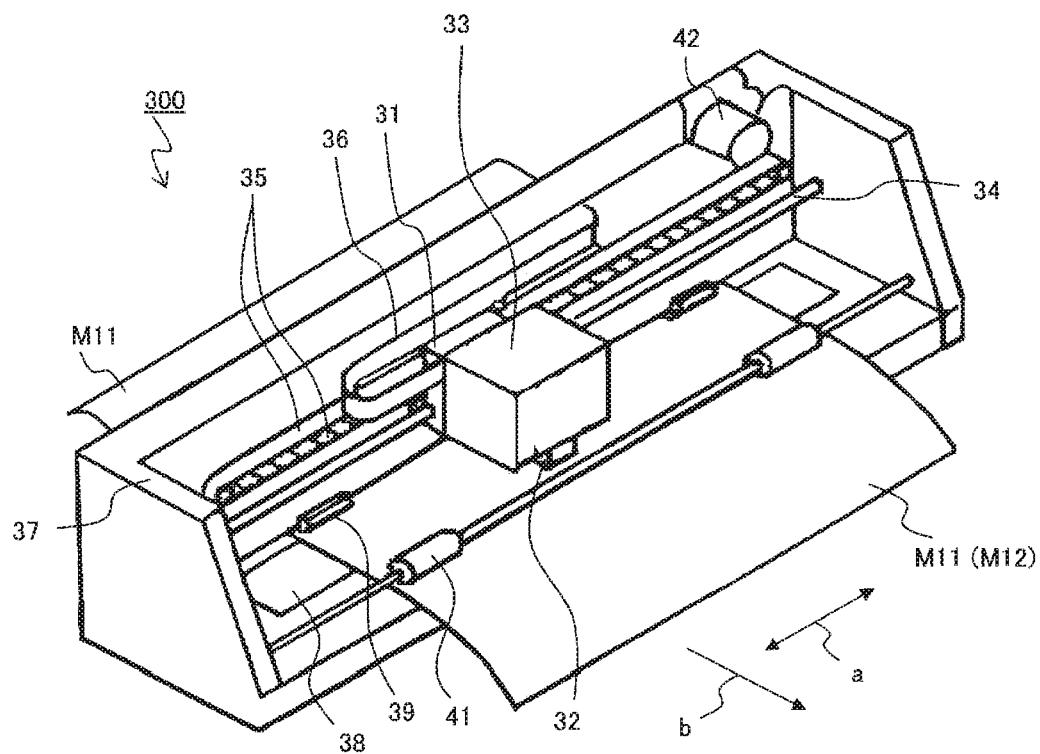
FIG. 7 is a perspective view depicting a configuration of an ink jet printer unit according to the embodiment of the present invention.

The above-described medium M11 is first prepared, and a black ink (black material) including carbon black serving as an electromagnetic wave thermal conversion material having an electromagnetic wave thermal conversion characteristic is printed by an ink jet method using a general-purpose ink jet printer unit 300 depicted in FIG. 7 based on first pattern forming image data previously prepared in a region, where irregularities corresponding to a first pattern serving as a fine pattern are to be formed, of a portion where the expansion layer 102 is desired to be expanded, by the expansion on a first surface 11A serving as a surface, on the side on which the expansion layer 102 is provided, of the medium M11, i.e., an upper surface of the ink receiving layer 103, to form the first electromagnetic thermal conversion material layer 104 (step S1; a first electromagnetic wave thermal conversion material formation step).

The medium M1 on which the first electromagnetic wave thermal conversion material layer 104 is formed is referred to as the processing medium M12. The first electromagnetic wave thermal conversion material layer 104 is formed of a material which more easily converts electromagnetic wave energy into thermal energy than a material in each of the base material 101, the expansion layer 102, and the ink receiving layer 103 included in the medium M11.

The first pattern forming image data will be described in detail below.

The ink jet printer unit 300 reads a gray scale value set every coordinates in the first pattern forming image data, and prints a black material (black ink) while controlling its concentration by area gradation, for example, based on the read value.

The medium M11 is before the expansion layer 102 is expanded. Thus, a structure, in which an original color tone to be represented by printing has been reproduced with a high quality can be formed using a general-purpose ink jet printer designed on the premise that printing is performed on a print medium having a flat surface.

In the present specification, a general-purpose printer is a general printer designed to be able to perform printing with a high quality without changing a head position in an ink discharge direction for a medium having a thickness (e.g., 0.5 mm) or less.

The general-purpose printer includes an ink jet printer for domestic use and a laser printer for office use, for example.

Note that if a print surface of the medium M11 is not flat, when such a general-purpose ink jet printer or laser printer is used, printing cannot be performed, or a printing quality becomes lower than that when printing is performed on a medium having a flat surface, that is, an original color tone to be created is not reproduced with a high quality.

Now, a plurality of image data used to form one structure will be described with reference to FIG. 3 to FIG. 5.

FIG. 3 to FIG. 5 are diagrams respectively depicting a plurality of image data used when first to third structures are formed.

Figure 5A:
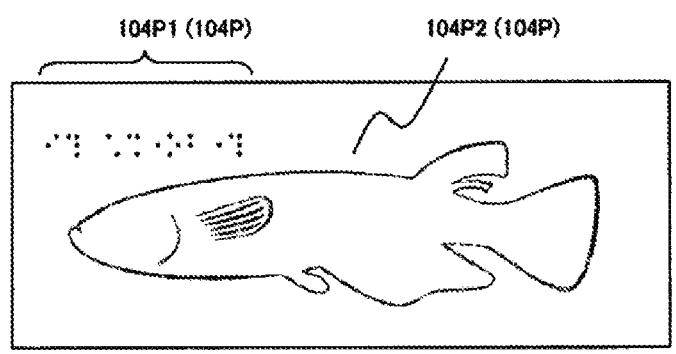
FIG. 5A to FIG. 5C are diagrams respectively depicting a plurality of images used to form a third structure.

FIG. 3A, FIG. 4A, and FIG. 5A are diagrams respectively depicting, when a first structure M14", a second structure M14", and a third structure M14" respectively representing an ancient burial mound, a microbe, and a fish are formed, first images (first patterns) 104P each representing a concentration distribution of a black material when the first electromagnetic wave thermal conversion material layer 104 formed using the black material on the first surface 11A, on the side on which the expansion layer 102 is provided, of the medium M11 is seen in a planar view.

The first image 104P is an image formed on the first surface 11A of the medium M11 to correspond to a portion, where irregularities faithfully corresponding to a fine pattern are to be formed, of the structure M14" to be formed.

First pattern forming image data for specifying the first image 104P is data including a gray scale value set every two-dimensional coordinates corresponding to the image 104P. When the first image 104P is formed on the first surface 11A of the medium M11 or the like, a black material is formed at a higher concentration in coordinates in which the gray scale value is large than in coordinates in which the gray scale value is small.

The first image 104P depicted in FIG. 3A represents a first portion 104P1 composed of Braille including information about an ancient burial mount to be represented by the first structure M14".

The first image 104P depicted in FIG. 4A represents a first portion 104P1 composed of Braille including information about a microbe to be represented by the second structure M14" and a second portion 104P2 to be more finely drawn than those in other portions such as antennas and legs in the microbe.

The first image 104P depicted in FIG. 5A represents a first portion 104P1 composed of Braille including information about a fish to be represented by the third structure M14" and a second portion 104P2 to be more finely drawn than those in other portions such as a contour and fins of the fish.

In any case, a uniform gray scale value is set within the first portion 104P1 and the second portion 104P2. Also, in the first portion 104P1, a larger gray scale value than that in the second portion 104P2 is set.

First pattern forming image data for a first portion for designating the first portion 104P1 in the first image 104P depicted in FIG. 3A, FIG. 4A, and FIG. 5A is managed as an image file or an image layer different from first pattern forming image data for a second portion for designating the second portion 104P2 in the first image 104P depicted in FIG. 4A and FIG. 5A.

Also, the first pattern forming image data for a first portion is not generated by analyzing an original image serving as a colored image previously prepared but is previously prepared as another image data independent of the colored image, unlike the second pattern forming image data for a second portion described below.

The second portion 104P2 in the first image 104P depicted in FIG. 4A and FIG. 5A is generated by analyzing the original image serving as the colored image previously prepared, extracting a portion (a fine pattern) which satisfies at least a part of a predetermined condition, and setting a desired uniform gray scale value for the extracted portion.

Figure 5B:
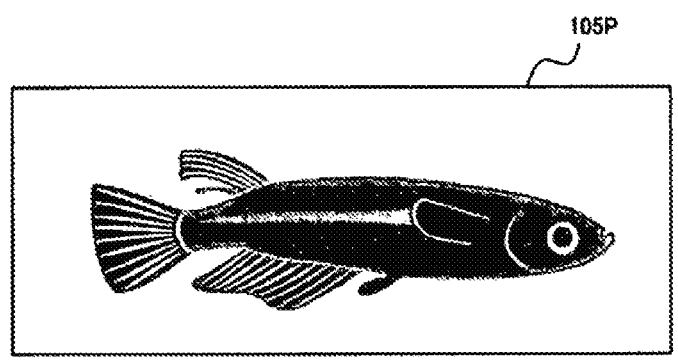
Figure 5C:
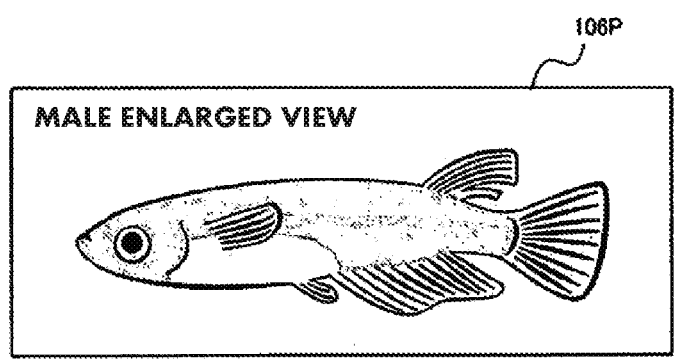

The above-described image analysis may be performed using a third image 106P depicted in each of FIG. 4C and FIG. 5C as an original image. Also, an image analysis method may be any known method. Examples of the above-described predetermined condition include the following.

A specific example is a stripe pattern composed of a plurality of line regions, that is, a portion where a black material is formed only within each of the line regions and is not formed in a region adjacent to each of the line regions and where a spatial frequency of the stripe pattern is smaller than a spatial frequency of a concentration distribution of a black material in a second image described below or is smaller than a predetermined spatial frequency value.

Also, a specific example is line regions, which are a portion representing a contour of an original image and portions other than the portion representing the contour, that is, a portion where a black material is formed only within the line regions and is not formed in a region adjacent to each of the line regions and where a width of the line region is smaller than a width of the line region by a concentration distribution of a black material in a second image described below or is smaller than a predetermined width value.

Note that the width of the line region is a size in a direction intersecting (e.g., orthogonal direction) a line extension direction.

The predetermined spatial frequency value, the width of the line region, described above, may be determined, as needed, by a preliminary experiment, a requirement specification, or the like.

Also, a portion where a black material is formed only within each of line regions and is formed in a region adjacent to each of the line regions to be lighter than that in the line region or a portion where a concentration difference therebetween exceeds a prescribed value may be included in the above-described predetermined condition.

Furthermore, another condition may be added, as needed, depending on a requirement specification or the like as the above-described predetermined condition.

Note that when the above-described first pattern forming image data for a first portion is not previously prepared as another image data independent of a colored image, an original image serving as the colored image may be generated by being analyzed.

In the case, more specifically, a region composed of a plurality of dot regions may be identified as a Braille region.

In other words, this Braille region is a portion where a black material is formed only within each of the dot regions and is not formed in a region adjacent to the dot region and where the area thereof is smaller than the area of a closed region included in a second image described below or smaller than a predetermined area value.

Note that the size of each of the dot regions in the Braille is determined by JIS (Japanese Industrial Standards), ISO (International Organization for Standardization) standards, and IEC (International Electrotechnical Commission) standards, for example.

Therefore, a region where Braille formed in the structure M14″ manufactured by expanding the processing medium M12 or the like has a size determined in the each standards or the dot region of a size determined in the each standards may be included in the above-described predetermined condition.

For example, in a JIS standard number JIST0921, a Braille size including a diameter of 1.3 to 1.7 mm and a height of 0.3 to 0.5 mm is determined. Thus, a region where Braille formed in the structure M14″ manufactured by expanding the processing medium M12 or the like has a diameter of 1.3 to 1.7 mm and a height of 0.3 to 0.5 mm or the dot region having a diameter of 1.7 mm or less can be included in the above-described predetermined condition.

FIG. 3A, FIG. 4A, and FIG. 5A are diagrams respectively depicting, when the first structure M14″, the second structure M14″, and the third structure M14″, described above, are formed, examples of second images (second patterns) 105P each representing a concentration distribution of a black material when a second electromagnetic wave thermal conversion material layer 105 formed using the black material on the second surface 11B, on the opposite side to the side on which the expansion layer 102 is provided, of the medium M11 is seen in a planar view.

The second image 105P is an image formed on the second surface 11B of the medium M11 to correspond to a portion where irregularities corresponding to a coarser pattern than the above-described first pattern are to be formed in the formed structure M14″. Also, the second image 105P is basically a mirror image of the third image 106P, described below.

Also, the second image 105P is formed on the second surface 11B of the medium 11 such that the above-described coarse pattern is at least arranged in a region, which does not overlap a portion where the first image 104P is formed for the first surface 11A of the medium 11, in a region of the second surface 11B of the medium 11. Second pattern forming image data for specifying the second image 105P is data including a gray scale value set every two-dimensional coordinates corresponding to the image 105P.

When the second image 105P is formed on the second surface 11B of the medium M11 or the like, like in the first pattern forming image data, a black material is formed at a higher concentration in coordinates in which the gray scale value is large than in coordinates in which the gray scale value is small.

The second images 105P depicted in FIG. 3B, FIG. 4B, and FIG. 5B are respectively gray scale images corresponding to irregularities to be formed in the first structure M14″, the second structure M14″, and the third structure M14″, and are each set such that an image concentration in a portion where an amount by which the expansion layer 102 is expanded is relatively large becomes higher than that in a portion where the amount by which the expansion layer 102 is expanded is relatively small.

More specifically, the second image 105P includes a first portion 105A having a relatively low concentration and a second portion 105B having a higher concentration than that of the first portion, as depicted in FIG. 1C, FIG. 9B, FIG. 11B, and FIG. 14B, for example.

The first portion 105A is a portion where a height by which the expansion layer 102 is raised in the structure M14″ to be formed is lower than that in a portion corresponding to the second portion 105B, and the second portion 105B is a portion where the height by which the expansion layer 102 is raised is higher than that in a portion corresponding to the first portion 105A.

The second image 105P depicted in each of FIG. 3A, FIG. 4B, and FIG. 5B may be generated by analyzing an original image serving as a colored image previously prepared, extracting a second pattern including a portion (a coarser pattern than a first pattern) which does not satisfy any of the above-described predetermined conditions, and setting a desired gray scale value for an extracted portion.

More specifically, the coarse pattern is a pattern which does not satisfy at least any one of Braille composed of a plurality of dot regions, a stripe pattern composed of a plurality of line regions, a line region representing a contour portion of an original image, and a line region representing a portion other than the contour portion.

Also, the coarse pattern may not satisfy a pattern corresponding to another predetermined condition to be added, as needed.

The second image 105P depicted in FIG. 3B is generated by analyzing an original image of an ancient burial mound, extracting a green portion representing trees in the ancient burial mound, and setting a desired uniform gray scale value for the extracted portion.

The second image 105P depicted in FIG. 4B is generated by analyzing an original image of a microbe, extracting a contour portion and an inner tissue portion of the microbe, setting the largest gray scale value for the contour portion, setting the second largest gray scale value for the inner tissue portion, and setting the smallest gray scale value for the remaining portion.

The second image 105P depicted in FIG. 5B is generated by analyzing an original image of a fish, extracting a tail fin portion and a belly portion of the fish, setting the largest gray scale value for the tail fin portion, setting the second largest gray scale value for the belly portion, and setting the smallest gray scale value for the remaining portion.

FIG. 3C, FIG. 4C, and FIG. 5C are diagrams depicting, when the first structure M14", the second structure M14", and the third structure M14", described above, are formed, examples of the third images (third patterns) 106P each representing a light or dark concentration distribution of a coloring material when the coloring material layer 106 formed using the coloring material on the first surface 11A of the medium M11 is seen in a planar view.

Note that in FIG. 3C, FIG. 4C, and FIG. 5C, a gray scale image is used for convenience of illustration, although a color image is actually used. The third image 106P may be the same image as the above-described original image, or may be a conversion image obtained based on the original image by performing various types of known image processing such as painting conversion processing for converting the original image into a desired tone such an oil painting tone or a pastel tone, processing for enhancing a contour, and HDR (High Dynamic Range) processing.

Third pattern foaming image data for specifying the third image 106P is data including respective gray scale values of display colors R, G, and B, for example, set every two-dimensional coordinates corresponding to the image 106P.

When the second image 105P is formed on the second surface 11B of the medium M11 or the like, the gray scale values of the display colors R, G, and B are respectively converted into gray scale values of print colors C, M, and Y, and respective coloring materials in C, M, and Y are formed at a higher concentration in coordinates in which the gray scale values are large than in coordinates in which the gray scale values are small.

Figure 1B:
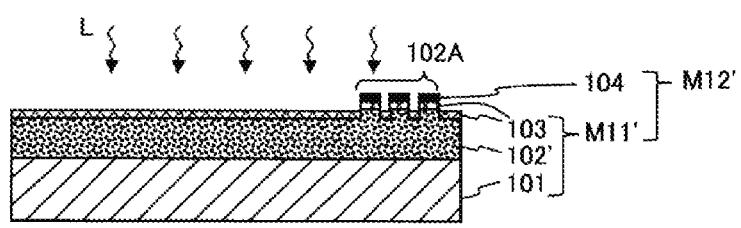
Figure 1C:
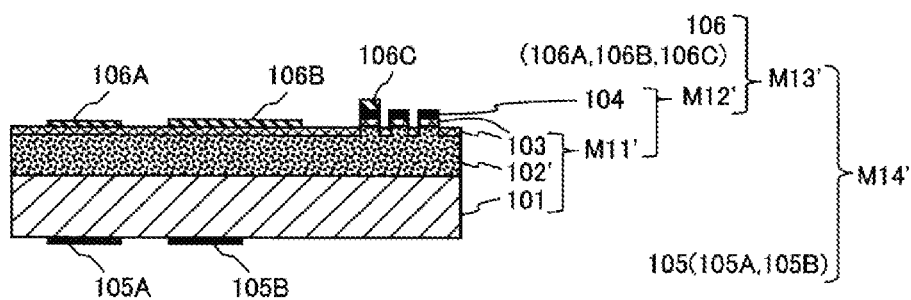

Also, the third image 106P includes a first portion 106A, a second portion 106B, and a third portion 106C, as depicted in FIG. 1C in the first embodiment, FIG. 9B in a second embodiment, FIG. 11B in a modification to the second embodiment, and FIG. 14B in a third embodiment, described below, and FIG. 3B, FIG. 4B, and FIG. 5B described above.

The first portion 105A in the second image 105P is a portion formed to overlap the first portion 106A in the third image 106P and a mirror image of the first portion 106A.

The second portion 105B in the second image 105P is a portion formed to overlap the second portion 106B in the third image 106P, and is not a complete mirror image of the first portion 106A but a portion generated based on the mirror image. There is no portion of the second image 105P corresponding to the third portion 106C in the third image 106P.

Then, a relationship among a formation density of an electromagnetic wave thermal conversion material, an amount of electromagnetic wave energy irradiated thereto, an amount by which the expansion layer 102 expands will be described.

If the first electromagnetic wave thermal conversion material layer 104 is uniformly irradiated with an electromagnetic wave regardless of a position of its surface, the higher a formation concentration of the electromagnetic wave thermal conversion material in the first electromagnetic wave thermal conversion material layer 104 in a portion is, the larger thermal energy (an amount of heat) generated in the portion becomes.

As a result, a portion of the expansion layer 102 overlapping a portion, where the formation concentration of the electromagnetic wave thermal conversion material is set high, in the first electromagnetic wave thermal conversion material layer 104 has a larger amount of heat conducted thereto, and thus absorbs a larger amount of heat than a portion of the expansion layer 102 overlapping a portion where the formation concentration is set low.

Also, a height by which a certain portion of the expansion layer 102 expands has a positive correlation with an amount of heat absorbed by the portion.

Therefore, if the first electromagnetic wave thermal conversion material layer 104 is uniformly irradiated with an electromagnetic wave regardless of a position on the first surface 11A of the medium M11 on which the first electromagnetic wave thermal conversion material layer 104 is formed, the portion of the expansion layer 102 overlapping the portion, where the formation concentration of the electromagnetic wave thermal conversion material is set high, in the first electromagnetic wave thermal conversion material layer 104 becomes higher in expansion height than the portion of the expansion layer overlapping the portion where the formation concentration is set low.

An expansion amount of the expansion layer 102 is limited. However, if a formation density of the first electromagnetic wave thermal conversion material layer 104 is the same within the limits, the larger an amount of an electromagnetic wave energy irradiated toward the first electromagnetic wave thermal conversion material layer 104 per unit area and unit time is, the larger an expansion amount of the expansion layer 102 in a portion where an electromagnetic wave is irradiated is.

Therefore, the formation concentration of the electromagnetic wave thermal conversion material in the first electromagnetic wave thermal conversion material layer 104 and the amount of the electromagnetic wave energy irradiated thereto may be set by being changed, as needed, in consideration of a mutual effect.

In a portion, where the first electromagnetic wave thermal conversion material layer 104 is not formed, of the expansion layer 102, electromagnetic wave energy is not easily converted into thermal energy. Thus, in the portion, the first electromagnetic wave thermal conversion material layer 104 does not substantially expand, or its expansion amount is negligibly smaller than those in other portions.

Note that similarly thereto, for the second electromagnetic wave thermal conversion material layer 105, described below, its formation concentration and an amount of electromagnetic wave energy irradiated thereto may also be set by being changed, as needed, in consideration of a mutual effect.

Here, the wavelength of the electromagnetic wave irradiated toward the electromagnetic wave thermal conversion material may be changed, as needed, depending on the electromagnetic wave thermal conversion material.

Carbon black serving as the electromagnetic wave thermal conversion material more easily absorbs an electromagnetic wave having a wavelength including a visible light region (380 to 750 nm) and a mid-infrared region (1400 to 4000 nm), centered around a near-infrared region (750 to 1400 nm) than electromagnetic waves having other wavelengths.

A material other than the carbon black may be used as the electromagnetic wave thermal conversion material, and an electromagnetic wave in a desired wavelength region among all wavelength regions may be irradiated depending on the material to be used.

Therefore, electromagnetic waves having other wavelengths such as a near-ultraviolet region (200 to 380 nm), a far-ultraviolet region (10 to 200 nm), and an infrared region (4000 to 15000 nm) excluding near-infrared and mid-infrared regions may be irradiated depending on the material.

Note that the above-described numerical value is one example, and a boundary between the wavelength regions is not limited to this numerical value.

Return to description of the structure forming method according to the first embodiment.

Subsequently to the first electromagnetic wave thermal conversion material formation step S1, the processing medium M12 is carried into an irradiation unit 200 with its first surface 11A directed upward.

Figure 8A:
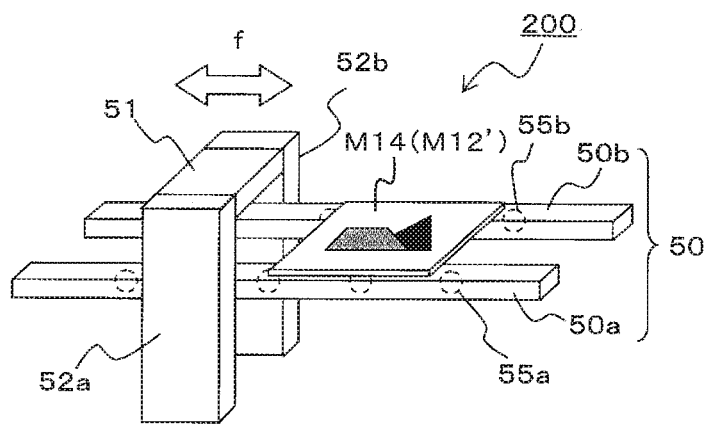
FIG. 8A is a perspective view depicting a configuration of an irradiation unit according to the first embodiment of the present invention.
Figure 8B:
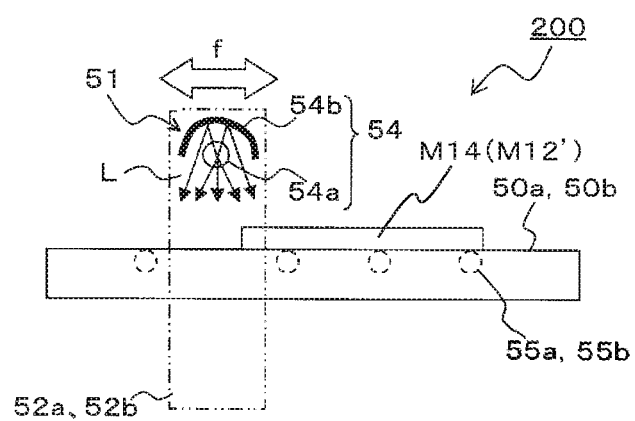
FIG. 8B is a side view depicting the configuration of the irradiation unit.

As depicted in FIG. 8B, the irradiation unit 200 includes a light source unit 54 (a radiation unit) including a light source 54a such as a halogen lamp in its upper portion in a vertical direction.

As depicted in FIG. 1B, the light source 54a in the irradiation unit 200 irradiates an electromagnetic wave L toward the processing medium M12 carried into the irradiation unit 200 from the side of the first surface 11A, on which the expansion layer 102 is formed, of the processing medium M12. A part of the electromagnetic wave L irradiated toward the processing medium M12 is converted into thermal energy in the first electromagnetic wave thermal conversion material layer 104, and the thermal energy obtained by the conversion is conducted to the expansion layer 102 so that the expansion layer 102 is heated to expand (step S2: a first expansion step).

Through this first expansion step S2, the portion 102A, where the electromagnetic wave thermal conversion material in the first electromagnetic wave thermal conversion material layer 104 is formed, of the expansion layer 102 in the processing medium M12 expands, to obtain the structure forming processing medium M12' which has partially expanded, depicted in FIG. 1B.

At this time, a formation concentration of the electromagnetic wave thermal conversion material in the first electromagnetic wave thermal conversion material layer 104 and an amount of electromagnetic wave energy to be irradiated thereto are set, as needed, such that an expansion height becomes 0.5 mm or less at a maximum.

Figure 9A:
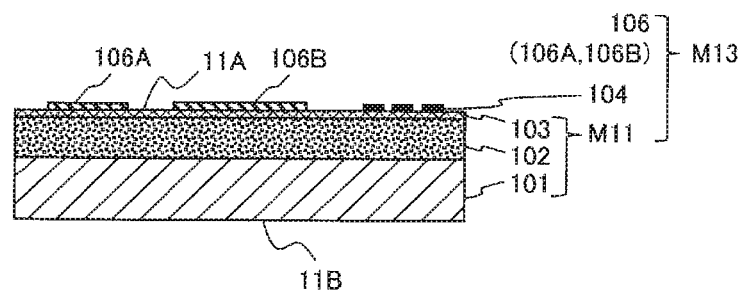
FIG. 9A to FIG. 9D are cross-sectional views respectively depicting structure forming steps according to a second embodiment of the present invention.
Figure 9B:
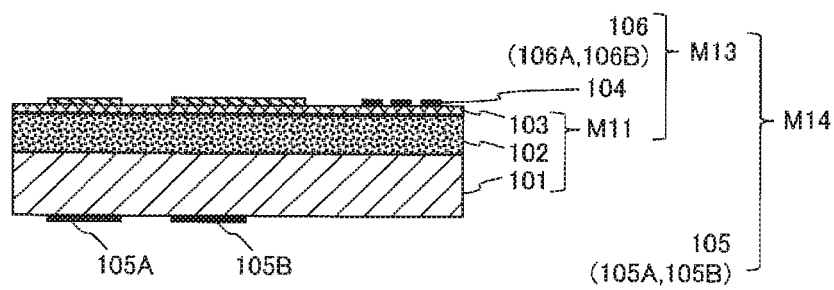
Figure 11A:
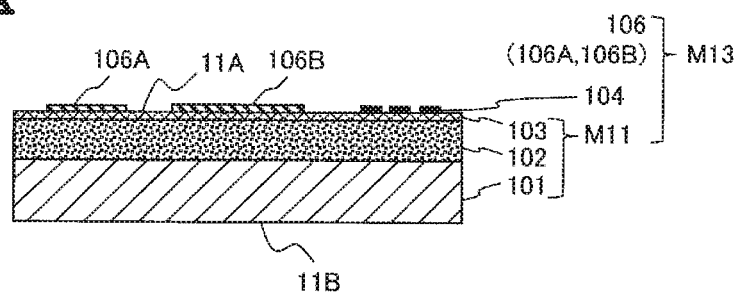
FIG. 11A to FIG. 11C are cross-sectional views respectively depicting structure forming steps according to a modification to the second embodiment of the present invention.
Figure 11B:
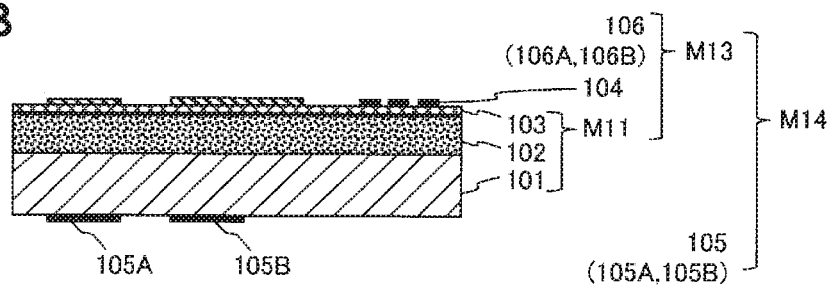
Figure 14A:
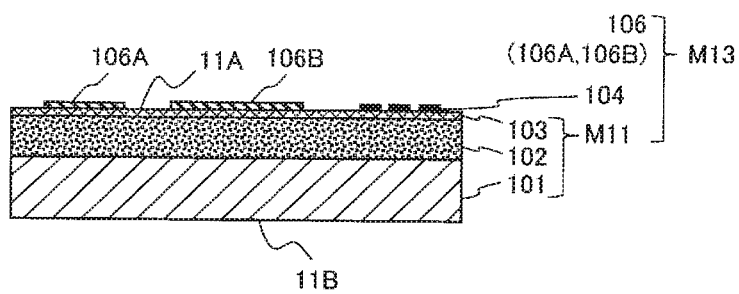
FIG. 14A to FIG. 14D are cross-sectional views respectively depicting structure forming steps according to a third embodiment of the present invention.
Figure 14B:
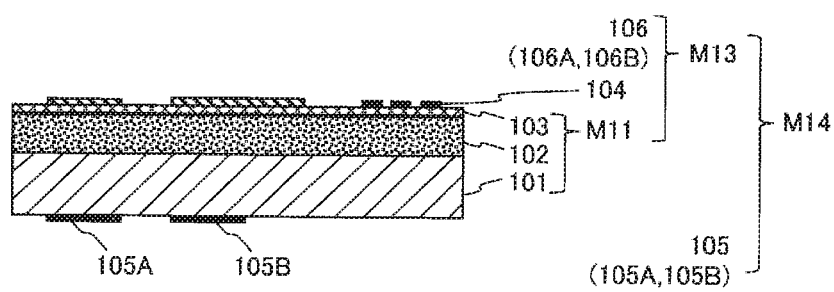

Also, as depicted in FIG. 1B, FIG. 9B depicting a second embodiment, FIG. 11B depicting a modification to the second embodiment, and FIG. 14B depicting a third embodiment, described below, and FIG. 3A, FIG. 4A, and FIG. 5A described above, a formation pattern of the electromagnetic wave thermal conversion material in the first electromagnetic wave thermal conversion material layer 104 is the first pattern serving as the fine pattern, described above.

If this first pattern is directly formed on the second surface 11B of the medium M11, i.e., a surface arranged with the base material 101 interposed between the expansion layer 102 in the medium M11 and itself, an amount of heat generated in the first electromagnetic wave thermal conversion material layer 104 is dispersed in a direction parallel to the second surface 11B of the medium M11 while being conducted to the expansion layer 102 via the base material 101 so that irregularities faithfully corresponding to the first pattern cannot be formed on the side of the first surface 11A of the medium M11.

However, in the first embodiment, this first pattern is directly formed on the second surface 11A of the medium M11, i.e., a surface arranged with the base material 101 not interposed between the expansion layer 102 in the medium M11 and itself. Thus, an amount of heat is not dispersed in a direction parallel to the second surface 11B of the medium M11 while being conducted to the expansion layer 102, and thus irregularities faithfully corresponding to the first pattern can be formed on the side of the first surface 11A of the medium M11.

Note that in the present specification, irregularities faithfully corresponding to a pattern means that respective widths in cross section of the pattern and the irregularities corresponding thereto are substantially the same.

Then, color inks in four colors, cyan C, magenta M, yellow Y, and black K respectively serving as coloring materials are printed by an ink jet method using the general-purpose ink jet printer unit 300 depicted in FIG. 7 on a surface, on the side on which the expansion layer 102' is provided, of the processing medium M12' to form a coloring material layer 106 based on third pattern forming image data previously prepared (step S3: a coloring material formation step).

As a result, a processing medium M13' is obtained as the processing medium M12' where the coloring material layer 106 has been formed, depicted in FIG. 1C. In the coloring material formation step S3 or a second electromagnetic wave thermal conversion material formation step S4, described below, a black material or a coloring material is formed such that corresponding portions in the second image 105P and the third image 106P serving as its mirror image overlap each other.

In the coloring material formation step S3, the color inks in four colors are used. Thus, an entire surface of the processing medium M12' is colored to visually have a desired color tone by passing through this step.

In a stage in which the coloring material formation step S3 is performed, the thickness of the processing medium M12' is suppressed to 5 mm or less. Thus, the coloring material layer 106 can be formed using the general-purpose ink jet printer unit 300, as described above.

Also, for the same reason, the coloring material layer 106 can be provided to cover at least a part of the first electromagnetic wave thermal conversion material layer 104, as depicted in FIG. 1C, using the general-purpose ink jet printer unit 300.

Also, in the coloring material formation step S3, printing is performed using an ink in black K including an electromagnetic wave thermal conversion material for a portion desired to be colored in black or gray.

As a result, a better-looking color tone can be represented than that when color inks in three colors, i.e., cyan C, magenta M, and yellow Y are mixed to represent black or gray.

Also, when the first electromagnetic wave thermal conversion material layer 104 and the second electromagnetic wave thermal conversion material layer 105 are formed, printing is also performed using an ink in black K including an electromagnetic wave thermal conversion material. Thus, the ink jet printer unit 300 may include only a cartridge storing an ink in black K including an electromagnetic wave thermal conversion material, and need not include a cartridge storing an ink in black K not including an electromagnetic wave thermal conversion material.

Here, a formation concentration of the black K in this case does not correspond to a height by which the expansion layer 102 is to expand but merely corresponds to a color tone in black or gray as a visual effect of the structure M14' to be formed. Thus, a formation concentration of the ink in black K printed in the coloring material formation step S3 is set independently of the height by which the expansion layer 102 is to expand.

Also, in the first embodiment, the coloring material formation step S3 is performed after the first expansion step S2. Thus, even if the coloring material layer 106 is formed of the ink in black K including the electromagnetic wave thermal conversion material, the structure M14" to be formed can be subjected to a desired color tone in black or gray to look good without affecting a height by which the expansion layer 102 designated by a second pattern formation image is to expand.

In the processing medium M12', an expansion height of the expansion layer 102 is suppressed to 5 mm or less at a maximum. Thus, printing can be performed using a general-purpose ink jet printer even in the coloring material formation step S3, like in the above-described first electromagnetic wave thermal conversion material formation step S1.

Note that if the first electromagnetic wave thermal conversion material layer 104 and the coloring material layer 106 are formed, a portion where both the first electromagnetic wave thermal conversion material layer 104 and the coloring material layer 106 are not formed, i.e., an exposed portion on a surface of the ink receiving layer 103 may be provided in at least a part of the ink receiving layer 103.

When a value is set to zero for a partial coordinate region common between the first pattern forming image data and the third pattern forming image data, the exposed portion on the surface of the ink receiving layer 103 can be provided.

As a result, after the structure M14' is formed, an exposed portion to which a handwriting character or the like can be added by a user using a ballpoint pen or the like can be provided on a surface of the structure M14".

Here, in a second expansion step S5, described below, as the expansion layer 102 expands so that its surface area increases, the density of the formed coloring material layer 106 decreases. Accordingly, a visual color tone of the structure M14" formed by expanding the processing medium M12' becomes lighter than that of the processing medium M12' before the expansion.

Accordingly, a value of the third pattern forming image data may be set such that the processing medium M12' has a visually desired color tone after the expansion. That is, the third pattern forming image data may be set such that the larger an expansion amount of the processing medium M12' in a portion is, the higher a formation concentration of a coloring material formed in the portion becomes.

Then, a black ink (black material) including carbon black serving as an electromagnetic wave thermal conversion material having an electromagnetic wave thermal conversion characteristic is printed by an ink jet method using the general-purpose ink jet printer unit 300 depicted in FIG. 7 based on second pattern forming image data previously prepared in a region, in a portion where the expansion layer 102 is desired to be expanded, where irregularities corresponding to the above-described second pattern including the coarse pattern are to be formed by the expansion on the second surface 11B serving as a surface, on the side on which the expansion layer 102 is provided, of the medium M11, i.e., a lower surface of the base material 101, to form the second electromagnetic thermal conversion material layer 105 (step S4; a second electromagnetic wave thermal conversion material formation step).

As a result, the processing medium M14' is obtained as the processing medium M12' where the second electromagnetic wave thermal conversion material layer 105 has been formed, depicted in FIG. 1C.

Figure 1D:
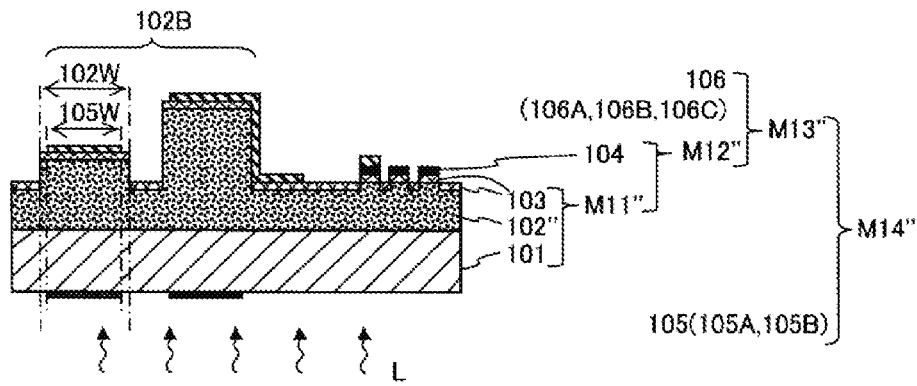

Then, the processing medium M14' is carried into the irradiation unit 200 with its second surface 11B directed upward. As depicted in FIG. 1D, the light source 54a in the irradiation unit 200 irradiates an electromagnetic wave L toward the processing medium M14' carried into the irradiation unit 200 from the side of the second surface 11B, on the opposite side to the side on which the expansion layer 102' is formed, of the processing medium M14'.

Apart of the electromagnetic wave L irradiated toward the processing medium M14' is converted into thermal energy in the second electromagnetic wave thermal conversion material layer 105, and the thermal energy obtained by the conversion is conducted to the expansion layer 102' via the base material 101 so that the expansion layer 102' is heated to expand (step S5: a second expansion step).

Through this second expansion step S5, a portion 102B, where the electromagnetic wave thermal conversion material in the second electromagnetic wave thermal conversion material layer 105 is formed, of the expansion layer 102' in the processing medium M14' expands, to obtain the desired structure M14" depicted in FIG. 1D.

As depicted in FIG. 1C, FIG. 9B depicting a second embodiment, FIG. 11B depicting a modification to the second embodiment, and FIG. 14B depicting a third embodiment, described below, and FIG. 3B, FIG. 4B, and FIG. 5B, described above, a formation pattern of the electromagnetic wave thermal conversion material in the second electromagnetic wave thermal conversion material layer 105 is the second pattern including the coarse pattern.

If this second pattern is directly formed on the second surface 11B of the medium M11, i.e., a surface arranged with the base material 101 interposed between the expansion layer 102 in the medium M11 and itself, an amount of heat generated in the second electromagnetic wave thermal conversion material layer 105 is dispersed in a direction parallel to the second surface 11B of the medium M11 while being conducted to the expansion layer 102 via the base material 101 so that irregularities faithfully corresponding to the first pattern cannot be formed on the side of the first surface 11A of the medium M11.

Therefore, a width 102W along the second surface 11B of the medium M11 on an upper surface of the expanded portion 102B in the structure M14" or the processing medium M14' becomes larger than respective widths 105W along the second surface 11B of the medium M11 of the first portion 105A in the second image 105P and the first portion 106A in the third image 106P, as depicted in FIG. 1D, FIG. 9D, FIG. 11C and FIG. 14D, or FIG. 14C.

Then, the processing medium M12' obtained through the above-described first expansion step S2 and the structure M14" obtained through the above-described second expansion step S5 will be described below.

The first electromagnetic wave thermal conversion material layer 104 is formed on the first surface 11A, on the side on which the expansion layer 102 is formed, of the medium M11, and the base material 101 is not interposed between the first electromagnetic wave thermal conversion material layer 104 and the expansion layer 102.

Therefore, the thermal energy which has occurred in the first electromagnetic wave thermal conversion material layer 104 is not dispersed in a planar direction of the base material 101 while being conducted to the expansion layer 102. Accordingly, even if the electromagnetic wave thermal conversion material in the first electromagnetic wave thermal conversion material layer 104 is formed according to a gray scale image having the first pattern serving as the fine pattern, the processing medium M12' in which irregularities faithfully corresponding to the gray scale image having the pattern are provided on a surface, on the side of the expansion layer 102, of the medium M11 can be formed.

Also, the second electromagnetic wave thermal conversion material layer 105 is formed on the second surface 11B, on the opposite side to the side on which the expansion layer 102 is formed, of the medium M11, and the base material 101 is interposed between the second electromagnetic wave thermal conversion material layer 105 and the expansion layer 102.

Therefore, the thermal energy, which has occurred in the second electromagnetic wave thermal conversion material layer 105, is dispersed in a planar direction of the base material 101 while being conducted to the expansion layer 102.

Accordingly, if the electromagnetic wave thermal conversion material in the second electromagnetic wave thermal conversion material layer 105 is formed according to the gray scale image having the first pattern serving as the fine pattern, irregularities faithfully corresponding to the gray scale image having the pattern cannot be formed on the side, on which the expansion layer 102 is provided, of the medium M11.

However, the electromagnetic wave thermal conversion material in the second electromagnetic wave thermal conversion material layer 105 is formed to be a gray scale image having the second pattern including the coarse pattern.

In the gray scale image having this pattern, even if the second electromagnetic wave thermal conversion material layer 105 is formed on the second surface 11B of the medium M11, the structure M14" in which irregularities corresponding to the second pattern are provided on the surface, on the side of the expansion layer 102, of the medium M11 can be formed.

Also, in the structure M14" formed through the above-described steps, a part of an electromagnetic wave thermal conversion material formed in the region, corresponding to the first pattern, of the first surface 11A of the medium M11 is exposed. Thus, the region appears dark, as viewed from the side of the first surface 11A of the medium M11.

However, if the first pattern is data representing Braille or a contour, as described above, this portion may appear dark in many cases.

Also, for a region corresponding to the second pattern, an electromagnetic wave thermal conversion material is formed on not the first surface 11A of the medium M11 but the second surface 11B of the medium M11. Thus, the region does not appear dark, as viewed from the side of the first surface 11A of the medium M11.

Therefore, in the first embodiment, a white material need not be formed to suppress the darkening as viewed from the first surface 11A of the medium M11. Thus, a structure colored to look good can be formed even if there is no step of forming the white material.

Note that for a portion where the coloring material layer 106 is provided to overlap the first electromagnetic wave thermal conversion material layer 104, the coloring material layer 106 suppress darkening due to the first electromagnetic wave thermal conversion material layer 104.

[Structure Forming Apparatus]

Figure 6:
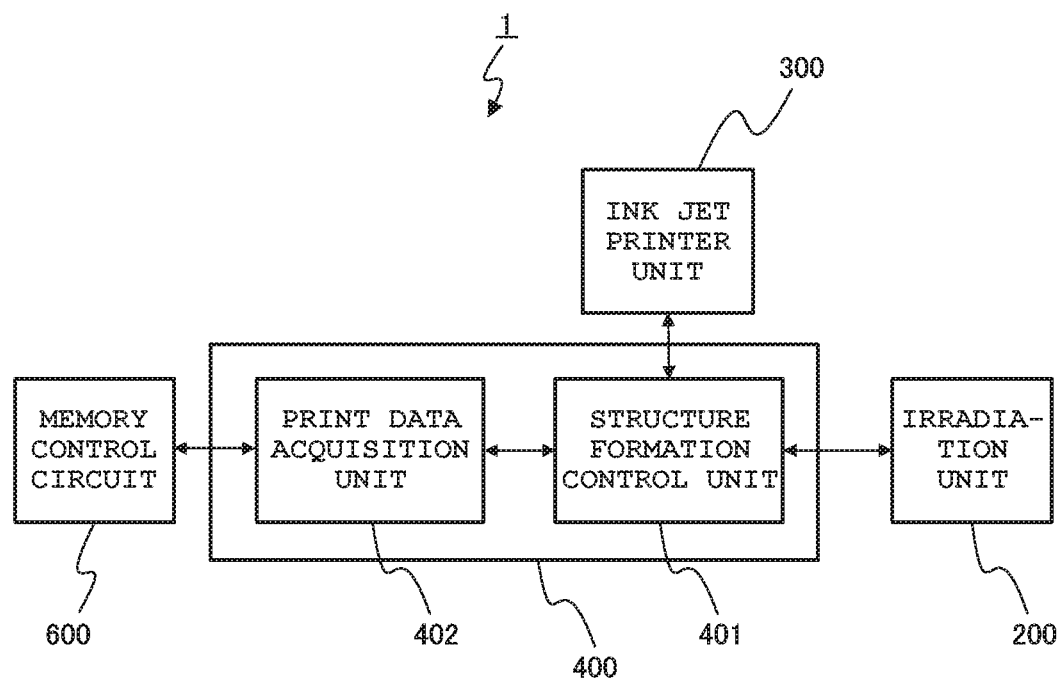
FIG. 6 is a control block diagram of a structure forming apparatus according to the embodiment of the present invention.

FIG. 6 is a control block diagram of a structure forming apparatus 1 according to the embodiment of the present invention.

A control unit 400 in the structure forming apparatus 1 functions as a structure formation control unit 401 which controls the ink jet printer unit (material forming unit) 300 and the irradiation unit 200 and forms a structure in cooperation with these.

Also, the control unit 400 in the structure forming apparatus 1 functions as a print data acquisition unit 402 which acquires print data and printing control data stored in a memory control circuit 600 and controls structure formation by the structure formation control unit 401 based on the acquired data.

A general configuration of the ink jet printer unit 300 serving as an example of the material forming unit will be then described with reference to FIG. 7.

In the embodiment of the present invention, as the ink jet printer unit 300, general-purpose ones not having a configuration specific to the present embodiment can be utilized. The ink jet printer unit 300 includes a carriage 31 reciprocably provided in a direction (main scanning direction) indicated by a two-headed arrow a perpendicular to a sheet conveyance direction (sub-scanning direction). A cartridge 33 storing an ink and a printing head 32 which performs printing on a medium using an ink within the cartridge 33 are attached to this carriage 31.

The cartridge 33 in the ink jet printer unit 300 stores respective color inks in cyan C, magenta M, and yellow Y and a black ink in black K with they being separated from one another.

An ink storage section in the cartridge 33 is connected to individual printing heads 32 respectively corresponding to the inks.

The carriage 31 is provided with a through hole, and is slidably supported by a guide rail 34 which penetrates through the through hole.

Also, the carriage 31 is provided with a sandwiched section, and the sandwiched section is held in a driving belt 35. When the driving belt 35 is driven, the printing head 32 and the cartridge 33, together with the carriage 31, move in the main scanning direction.

The control unit 400 in the structure forming apparatus is connected to the printing head 32 via a flexible communication cable 36.

The structure formation control unit 401 sends out acquired print data and printing control data to the printing head 32 via the flexible communication cable 36, and controls the printing head 32 based on these data.

A platen 38 is disposed to extend in the main scanning direction at a position opposing the printing head 32 below an inner frame 37.

This platen 38 constitutes a part of a sheet conveyance path.

A medium M11 and a processing medium M12 are intermittently conveyed in the sub-scanning direction by a sheet feeding roller pair 39 (the lower roller is not depicted) and a sheet discharge roller pair 41 (the lower roller is not depicted) with their lower surfaces contacting the top of the platen 38).

The sheet feeding roller pair 39 and the sheet discharge roller pair 41 are driven by the control unit 400 in the structure forming apparatus 1.

The control unit 400 in the structure forming apparatus 1 controls a motor 42, the printing head 32, the sheet feeding roller pair 39, and the sheet discharge roller pair 41, to convey the printing head 32, together with carriage 31, to an appropriate position in the main scanning direction via the driving belt 35 connected to the motor 42 while spraying, during a stop period of conveyance of the medium M11 and a processing medium M13', a black ink droplet in black K toward each of the media by the printing head 32, to print the first electromagnetic wave thermal conversion material layer 104 and the second electromagnetic wave thermal conversion material layer 105, respectively, on a first surface 11A of the medium M11 and a second surface 11B of the processing medium M13'.

Also, when respective color ink droplets in cyan C, magenta M, and yellow Y and the black ink droplet in black K are sprayed toward a processing medium M12' during a stop period of conveyance of the processing medium M12', the coloring material layer 106 is printed on a first surface 11A of the processing medium M12'.

FIG. 8A is a perspective view depicting a configuration of the irradiation unit 200.

FIG. 8B is a side view depicting the configuration of the irradiation unit 200.

As depicted in FIG. 8A, a processing medium M12 or a processing medium M14' is mounted on mounting bases 50a and 50b in the irradiation unit 200 so as to be conveyable along a direction indicated by a hollow arrow f (hereinafter also referred to as a direction f), respectively, by conveyance rollers 55a and 55b incorporated into the mounting bases 50a and 50b when carried into the irradiation unit 200.

The irradiation unit 200 is provided such that a heat source section 51 into which a light source unit 54 is incorporated is arranged above the mounting bases 50a and 50b.

The heat source section 51 is supported by support poles 52a and 52b on both its sides.

The control unit 400 in the structure forming apparatus 1 controls the conveyance rollers 55a and 55b, to move the processing medium M12 or the processing medium M14' mounted on the mounting bases 50a and 50b relative to the heat source section 51.

While the processing medium M12 or the processing medium M14' and the heat source section 51 are relatively moved, the control unit 400 in the structure forming apparatus 1 controls a light source 54a in the light source unit 54 included in the heat source section 51, to cause the light source unit 54 to irradiate an electromagnetic wave toward the processing medium M12 or the processing medium M14'. The light source unit 54 includes a reflecting mirror 54b, and enables the reflecting mirror 54b to efficiently irradiate the electromagnetic wave radiated from the light source 54a toward the processing medium M12 or the processing medium M14'.

As described above, the larger an amount of electromagnetic wave energy irradiated per unit area and unit time toward the electromagnetic wave thermal conversion material layer 104 formed on a surface of the expansion layer 102 is, the more greatly the expansion layer 102 expands.

The control unit 400 in the structure forming apparatus 1 may control the support poles 52a and 52b and the light source 54a such that a movement speed of the heat source section 51 relative to the processing medium M12 or the processing medium M14' becomes constant and an output of the light source 54a becomes constant, for example.

However, if the amount of the electromagnetic wave energy irradiated per unit area and unit time toward the electromagnetic wave thermal conversion material layer 104 in the expansion layer 102 becomes uniform over the entire processing medium M12 or processing medium M14', a control method by the control unit 400 in the structure forming apparatus 1 is not limited to this.

A 900-watt halogen lamp, for example, is used as the light source 54a, and is arranged approximately 4 cm apart from the processing medium M12 or the processing medium M14'.

A movement speed of the light source unit 54 relative to the processing medium M12 or the processing medium M14' is set to approximately 20 mm per second.

Under this condition, the processing medium M12 or the processing medium M14' is heated to 100° C. to 110° C., and a portion, where the first electromagnetic wave thermal conversion material layer 104 or the second electromagnetic wave thermal conversion material layer 105 is formed, of the processing medium M12 or the processing medium M14' expands.

The structure forming method of the first embodiment described above includes a first step of performing the first electromagnetic wave thermal conversion material formation step S1 for forming at least the first pattern 104 serving as the fine pattern using the electromagnetic wave thermal conversion material on the first surface 11A, on the side on which the expansion layer 102 which expands by heating is provided, of the medium 11 including the expansion layer 102 and the first expansion step S2 for irradiating the electromagnetic wave toward the electromagnetic wave thermal conversion material formed in the first pattern 104 to expand the portion, corresponding to the first pattern 104, of the expansion layer 102, and a second step of performing the second electromagnetic wave thermal conversion material formation step S4 for forming the second pattern 105 including the coarser pattern than the first pattern 104 using the electromagnetic wave thermal conversion material in the region not corresponding to the first pattern 104 on the second surface 11B, on the opposite side to the side on which the expansion layer 102 is provided, of the medium M11 and the second expansion step S5 for irradiating the electromagnetic wave toward the electromagnetic wave thermal conversion material formed in the second pattern 105 to expand the portion, corresponding to the second pattern 105, of the expansion layer 102.

Therefore, according to the first embodiment, irregularities faithfully corresponding to the first pattern 104 serving as the fine pattern and irregularities corresponding to the second pattern 105 including the coarser pattern than the first pattern 104 can form the structure M14" formed on the side, on which the expansion layer 102 is provided, of the medium M11.

A modification to the above-described first embodiment will be described below. Although the second electromagnetic wave thermal conversion material formation step S4 is performed after the coloring material formation step S3 in the above-described first embodiment, a second electromagnetic wave thermal conversion material formation step S4 may be performed prior to at least a second expansion step S5, for example, prior to a first expansion step S2.

In this case, the first expansion step S2 and the second expansion step S5 are performed after a second electromagnetic wave thermal conversion material layer 105 is formed in a processing medium. Thus, although a portion, corresponding to a second image 105P, of an expansion layer 102 may expand in the first expansion step S2, and a portion, corresponding to a first image 104P, of the expansion layer 102 may expand in the second expansion step S5, its effect is small or negligible because an electromagnetic wave thermal conversion material in each of the portions is formed on the opposite side thereof with a base material 101 sandwiched therebetween, as viewed in an irradiation direction of an electromagnetic wave L.

Note that when the portion, corresponding to the second image 105P, of the expansion layer 102 and the portion, corresponding to the first image 104P, of the expansion layer 102 are previously set not to overlap each other in a thickness direction of the medium M11, this effect can be eliminated.

Also, in the above-described first embodiment, the respective amounts of heat of the heat source section 51 are the same and the respective movement speeds of the thermal source section 51 relative to the processing medium M12 or the processing medium M14' are the same in the first expansion step S2 and the second expansion step S5.

In other words, the respective amounts of the electromagnetic wave energy irradiated toward the processing medium M12 or the processing medium M14' from the light source 54a per unit time or unit area are the same.

For example, an amount of heat of a heat source section 51 may be made larger and a relative movement speed thereof may be made higher in the first expansion step S2 than those in the second expansion step S5 while respective amounts of electromagnetic wave energy to be irradiated per unit time and unit area are made the same in the first expansion step S2 and the second expansion step S5.

As a result, a time period required to form a structure M14" can be more shortened, and an amount of heat generated by conversion from the electromagnetic wave L in the second image 105P formed on a second surface 11B of the medium M11, i.e., an excessive amount of heat conduction to the expansion layer 102 can be kept lower while the electromagnetic wave L is irradiated from the side of a first surface 11A of the medium M11, as compared with those in the above-described first embodiment.

Also, if a formation concentration of an electromagnetic wave thermal conversion material included in a first electromagnetic wave thermal conversion material layer 104 is large, a black color looks so much darker. When a coloring material is formed thereon, a color tone of a coloring material layer 106 may look drabber.

On the other hand, when the expansion layer 102 is to expand to a desired height, an amount of heat of the heat source section 51 is made larger and a relative movement speed thereof is made higher than those in the above-described first embodiment so that a formation concentration of the electromagnetic wave thermal conversion material included in the first electromagnetic wave thermal conversion material layer 104 can be kept lower than that in the above-described first embodiment.

As a result, if the coloring material layer 106 is overlaid and printed on the first electromagnetic wave thermal conversion material layer 104, the color tone of the coloring material layer 106 can be made clearer and made to look better.

In the above-described first embodiment, a coloring material formation step S3 may be performed at any time after the first expansion step S2 and before the second expansion step S5.

To represent a black or gray color tone of the structure M14", if carbon black is included in the coloring material layer 106, when the coloring material formation step is performed before the first expansion step, a height by which the expansion layer 102 expands is affected by the carbon black so that the expansion layer 102 cannot be expanded to a desired height initially planned.

Also, after passing through the second expansion step S5, the first surface 11A of a medium M11" expands over 5 mm. Thus, printing using a general-purpose ink jet printer cannot be performed.

As described above, these problems can be avoided by performing the coloring material formation step S3 in the first embodiment after the first expansion step and before the second expansion step.

Second Embodiment

A second embodiment of the present invention will be described below with reference to the drawings.

Description of a configuration in the second embodiment, which is common to the configuration in the above-described first embodiment, is omitted, as needed, after common reference numerals are used.

The second embodiment differs from the first embodiment in that a first electromagnetic wave thermal conversion material and a coloring material are simultaneously formed in the same step on a first surface 11A of an expansion layer 102.

FIG. 9 is a cross-sectional view depicting structure forming steps according to the second embodiment.

Figure 10:
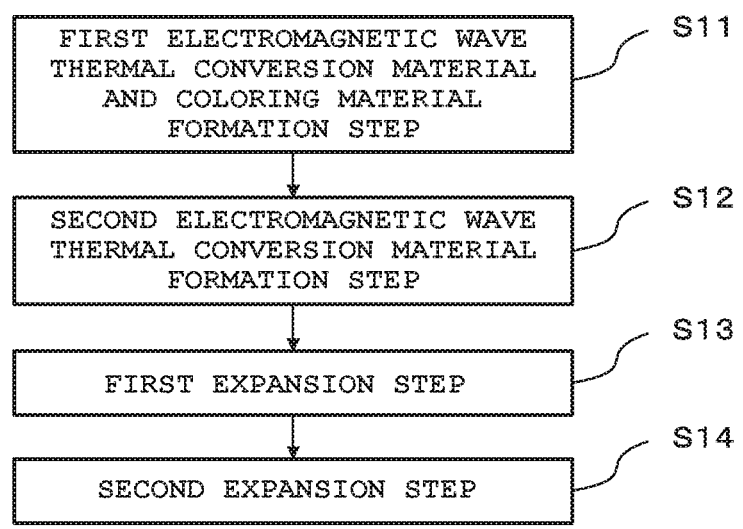
FIG. 10 is a flowchart for describing a structure forming method according to the second embodiment of the present invention.

FIG. 10 is a flowchart depicting a structure forming method according to the second embodiment.

A medium M11, described above, is first prepared, and an ink jet printer unit 300 is then used, to print a black ink (black material) based on first pattern forming image data previously prepared on a first surface 11A of the medium M11 to form a first electromagnetic wave thermal conversion material layer 104, and at the same time to print color inks (coloring materials) in three colors, i.e., cyan C, magenta M, and yellow Y based on third pattern forming image data previously prepared to form a coloring material layer 106 (step S11: a first electromagnetic wave thermal conversion material and coloring material formation step).

Through this step, a processing medium M13 serving as the medium M11 in which the first electromagnetic wave thermal conversion material layer 104 and the coloring material layer 106 are formed, as depicted in FIG. 9A, is obtained. Although the first electromagnetic wave thermal conversion material layer 104 and the coloring material layer 106 are formed not to overlap each other in FIG. 9A, the layers may be formed to overlap each other.

If the layers are formed to overlap each other, when the coloring material layer 106 is formed on the first electromagnetic wave thermal conversion material layer 104, darkening of the first electromagnetic wave thermal conversion material layer 104 can be made less noticeable.

In this first electromagnetic wave thermal conversion material and coloring material formation step S11, printing is performed not using an ink in black K including an electromagnetic wave thermal conversion material such as carbon black but using color inks in three colors, i.e., cyan C, magenta M, and yellow Y not including an electromagnetic wave thermal conversion material for a portion desired to be colored in black or gray.

As a result, a black or gray portion of the coloring material layer 106 does not include an electromagnetic wave thermal conversion material. Thus, when an electromagnetic wave L is irradiated from the side of the first surface 11A of the medium M11 in a first expansion step S13, described below, electromagnetic wave energy is not converted into an amount of heat in the black or gray portion of the coloring material layer 106.

Therefore, the first expansion step S13 may be performed after the coloring material layer 106 is formed, unlike in the above-described first embodiment. Thus, the first electromagnetic wave thermal conversion material layer 104 and the coloring material layer 106 can be simultaneously formed, and thus the number of steps can be decreased by one, as compared with that when they are respectively formed in separate steps.

Then, a black ink is printed based on second pattern forming image data previously prepared on a second surface 11B of the medium M13, to form a second electromagnetic wave thermal conversion material layer 105 (step S12: a second electromagnetic wave thermal conversion material formation step).

Through this step, a processing medium M14 serving as the processing medium M13, in which the second electromagnetic wave thermal conversion material layer 105 has been formed, depicted in FIG. 9B, is obtained.

In the first electromagnetic wave thermal conversion material and coloring material formation step S11 and the second electromagnetic wave thermal conversion material formation step S12, a surface, on which each of the material layers 104, 105, and 106 is formed, has a flat surface. Thus, a structure in which an original color tone to be represented by printing has been reproduced with a high quality can be formed using a general-purpose ink jet printer, like in the above-described first embodiment.

Then, the processing medium M14 is carried into an irradiation unit 200 with its first surface 11A directed upward.

A part of the electromagnetic wave L irradiated toward the processing medium M14 is converted into thermal energy in the first electromagnetic wave thermal conversion material layer 104, and the thermal energy obtained by the conversion is conducted to the expansion layer 102 so that the expansion layer 102 is heated to expand (step S13: a first expansion step).

Figure 9C:
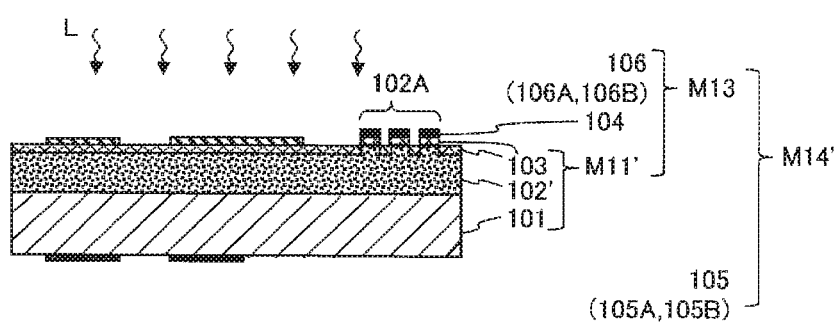

Through this first expansion step S13, a portion 104, where the coloring material in the coloring material layer 106 is formed, of the expansion layer 102 in the processing medium M13 does not expand but only a portion 102A, where the electromagnetic wave thermal conversion material in the first electromagnetic wave thermal conversion material layer 104 is formed, expands, to obtain a processing medium M14' which has partially expanded, depicted in FIG. 9C.

At this time, a formation concentration of the electromagnetic wave thermal conversion material in the first electromagnetic wave thermal conversion material layer 104 and an amount of electromagnetic wave energy irradiated thereto are set, as needed, such that an expansion height becomes 0.5 mm or less at a maximum.

Then, the processing medium M14' is carried into the irradiation unit 200 with its second surface 11B directed upward.

A part of the electromagnetic wave L irradiated toward the processing medium M14' is converted into thermal energy in the second electromagnetic wave thermal conversion material layer 105, and the thermal energy obtained by the conversion is conducted to an expansion layer 102' via a base material 101 so that the expansion layer 102' is heated to expand (step S14: a second expansion step).

Figure 9D:
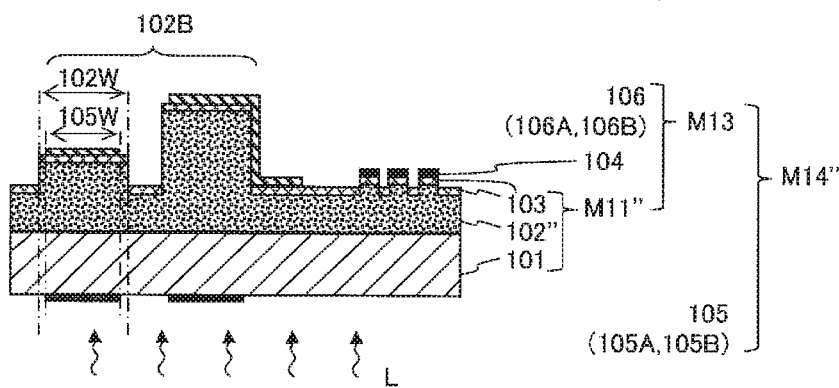

A portion 102B, where the electromagnetic wave thermal conversion material in the second electromagnetic wave thermal conversion material layer 105 is formed, of the expansion layer 102 in the processing medium M14' expands, to obtain a desired structure M14" depicted in FIG. 9D.

The structure forming method according to the second embodiment described above includes a first step of performing the first electromagnetic wave thermal conversion material and coloring material formation step S11 for forming at least the the first pattern 104 serving as the fine pattern using the electromagnetic wave thermal conversion material on the first surface 11A, on the side on which the expansion layer 102 which expands by heating is provided, of the medium 11 including the expansion layer 102 and then the first expansion step S13 for irradiating the electromagnetic wave toward the electromagnetic wave thermal conversion material formed in the first pattern 104 to expand the portion, corresponding to the first pattern 104, of the expansion layer 102, and a second step of performing the second electromagnetic wave thermal conversion material formation step S12 for forming the second pattern 105 including the coarser pattern than the first pattern 104 using the electromagnetic wave thermal conversion material in a region, not corresponding to the first pattern 104, of the second surface 11B, on the opposite side to the side on which the expansion layer 102 is provided, of the medium M11 and then the second expansion step S14 for irradiating the electromagnetic wave toward the electromagnetic wave thermal conversion material formed in the second pattern 105 to expand a portion, corresponding to the second pattern 105, of the expansion layer 102.

Therefore, according to the second embodiment, irregularities faithfully corresponding to the first pattern 104 serving as the fine pattern and irregularities corresponding to the second pattern 105 including the coarser pattern than the first pattern 104 can form the structure M14" formed on the side, on which the expansion layer 102 is provided, of the medium M11.

Modification to Second Embodiment

A modification to the second embodiment of the present invention will be described below with reference to the drawings.

Description of a configuration in the modification to the second embodiment, which is common to the configuration in the above-described second embodiment, is omitted, as needed, after common reference numerals are used for simplicity.

FIG. 11 is a cross-sectional view depicting structure forming steps according to the modification to the second embodiment.

Figure 12:
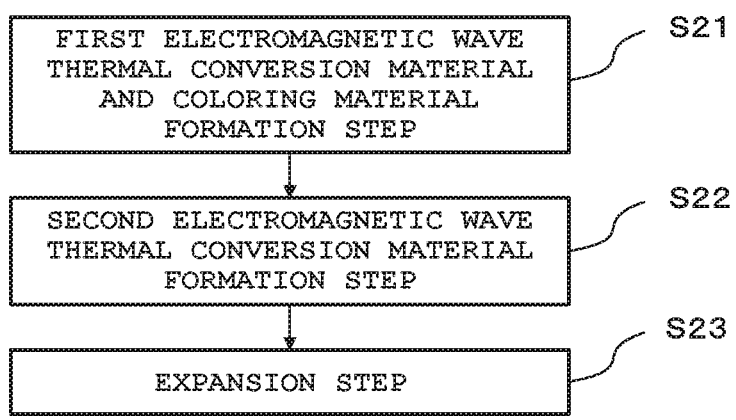
FIG. 12 is a flowchart for describing a structure forming method according to the modification to the second embodiment of the present invention.

FIG. 12 is a flowchart depicting a structure forming method according to the modification to the second embodiment.

Figure 13A:
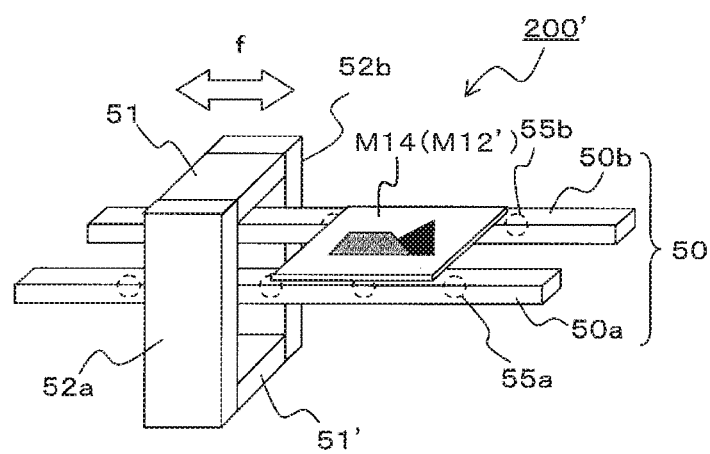
FIG. 13A is a perspective view depicting a configuration of an irradiation unit according to the modification to the second embodiment of the present invention.
Figure 13B:
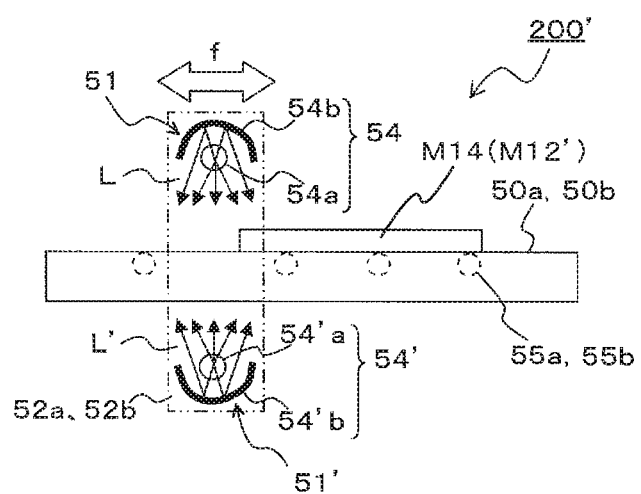
FIG. 13B is a side view depicting the configuration of the irradiation unit.

FIG. 13 is a side view depicting a configuration of an irradiation unit 200' in the modification to the second embodiment.

As depicted in FIG. 12, the modification to the second embodiment differs from the second embodiment in that the expansion steps (the first expansion step S13 and the second expansion step S14), which have been separately performed in two steps in the second embodiment, are simultaneously performed.

As a result, the number of steps can be made smaller than that when the expansion steps are separately performed in two steps.

In the modification to the second embodiment, the irradiation unit 200' depicted in FIG. 13 is used.

The irradiation unit 200' is provided such that a heat source section 51 into which a light source unit 54 is incorporated is arranged above mounting bases 50a and 50b while being provided such that a heat source section 51' into which a light source unit 54' is incorporated is arranged below the mounting bases 50a and 50b.

Figure 11C:
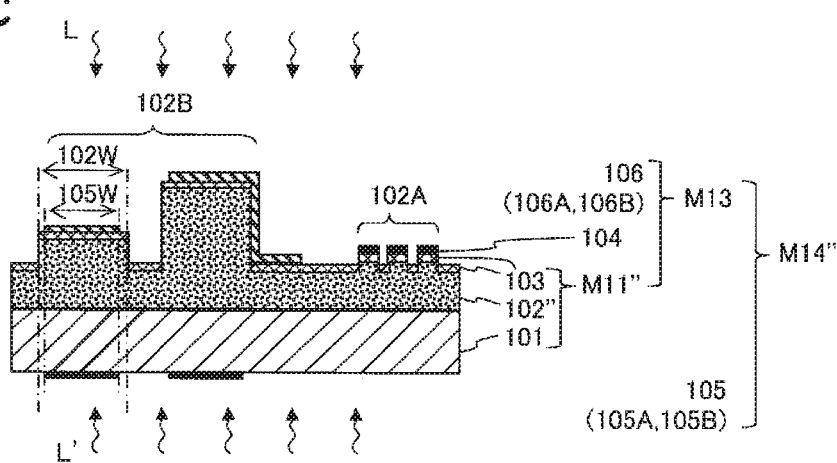

As depicted in FIG. 11C, light sources 54a and 54'a in the irradiation unit 200' respectively irradiate electromagnetic waves L and L' toward a processing medium M14 carried into the irradiation unit 200' from the side of a first surface 11A and the side of a second surface 11B of the processing medium M14. Respective parts of the electromagnetic waves L and L' irradiated toward the processing medium M14 are each converted into thermal energy in the first electromagnetic wave thermal conversion material layer 104, and the thermal energy obtained by the conversion is conducted to an expansion layer 102 so that the expansion layer 102 is heated to expand (step S23: an expansion step).

Through this expansion step S23, a portion 102A, where an electromagnetic wave thermal conversion material in a first electromagnetic wave thermal conversion material layer 104 is formed, of the expansion layer 102 in the processing medium M14 expands, to obtain a structure M14" which has partially expanded, depicted in FIG. 1C.

According to the structure forming method according to the modification to the second embodiment described above, the number of steps can be more reduced than that when the expansion steps are separately performed in two steps in addition to a similar effect to that in the above-described second embodiment being obtained.

Third Embodiment

A third embodiment of the present invention will be described below with reference to the drawings.

Description of a configuration in the third embodiment, which is common to the configuration in the above-described second embodiment, is omitted, as needed, after common reference numerals are used.

FIG. 14 is a cross-sectional view depicting structure forming steps according to the third embodiment.

Figure 15:
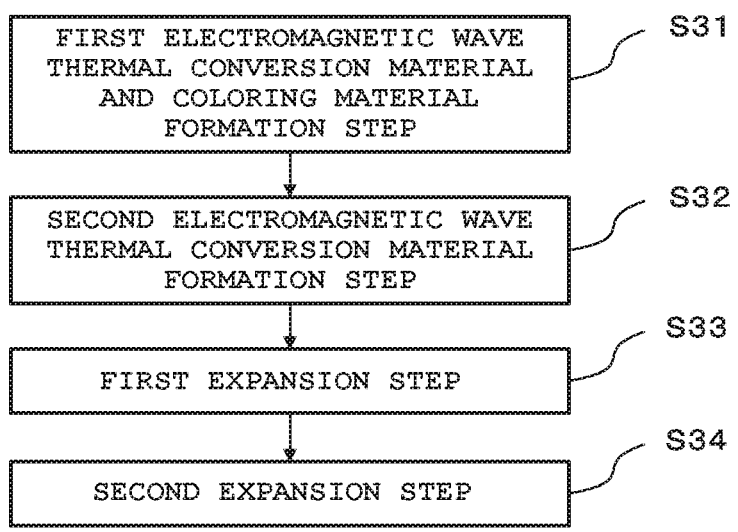
FIG. 15 is a flowchart for describing a structure forming method according to the third embodiment of the present invention.

FIG. 15 is a flowchart describing a structure forming method according to the third embodiment.

A medium M11, described above, is first prepared, and an ink jet printer unit 300 is then used, to print a black ink (black material) based on first pattern forming image data previously prepared on a first surface 11A of the medium M11 to form a first electromagnetic wave thermal conversion material layer 104, and at the same time to print color inks (coloring materials) in four colors, i.e., black K, cyan C, magenta M, and yellow Y based on third pattern forming image data previously prepared to form a coloring material layer 106 (step S31: a first electromagnetic wave thermal conversion material and coloring material formation step).

Through this step, a processing medium M13 serving as the medium M11 in which the first electromagnetic wave thermal conversion material layer 104 and the coloring material layer 106 are formed, depicted in FIG. 14A, is obtained.

In this first electromagnetic wave thermal conversion material and coloring material formation step S31, printing is performed using an ink in black K not including an electromagnetic wave thermal conversion material such as carbon black for a portion desired to be colored in black or gray, like in the second embodiment and the modification thereto.

A black or gray portion of the coloring material layer 106 does not include an electromagnetic wave thermal conversion material. Thus, when an electromagnetic wave L is irradiated from the side of the first surface 11A of the medium M11 in a first expansion step S34, described below, electromagnetic wave energy is not converted into an amount of heat in the black or gray portion of the coloring material layer 106.

Accordingly, in the third embodiment, the first expansion step S34, described below, can be performed after the coloring material layer 106 is formed.

Then, a black ink is printed based on second pattern forming image data previously prepared on a second surface 11B of the medium M13, to forma second electromagnetic wave thermal conversion material layer 105 (step S32: a second electromagnetic wave thermal conversion material formation step).

Through this step, a processing medium M14 serving as the processing medium M13 in which the second electromagnetic wave thermal conversion material layer 105 has been formed, depicted in FIG. 14B, is obtained.

Then, the processing medium M14 is carried into an irradiation unit 200 with its second surface 11B directed upward.

Apart of the electromagnetic wave L irradiated toward the processing medium M14 is converted into thermal energy in the first electromagnetic wave thermal conversion material layer 104, and the thermal energy obtained by the conversion is conducted to an expansion layer 102 so that the expansion layer 102 is heated to expand (step S33: a second expansion step).

Figure 14C:
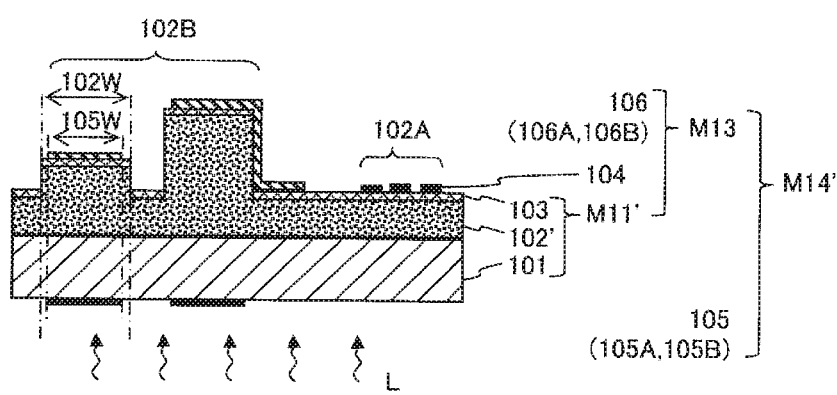

Through this second expansion step S33, a portion 102A, where the coloring material in the coloring material layer 106 is formed, of the expansion layer 102 in the processing medium M13 does not expand but only a portion 102B, where the electromagnetic wave thermal conversion material in the second electromagnetic wave thermal conversion material layer 105 is formed, expands, to obtain a structure forming processing medium M14' which has partially expanded, as depicted in FIG. 14C.

Then, the processing medium M14' is carried into the irradiation unit 200 with its first surface 11A directed upward.

A part of the electromagnetic wave L irradiated toward the processing medium M14' is converted into thermal energy in the second electromagnetic wave thermal conversion material layer 105, and the thermal energy obtained by the conversion is conducted to an expansion layer 102' via a base material 101 so that the expansion layer 102' is heated to expand (step S34: a first expansion step).

Figure 14D:
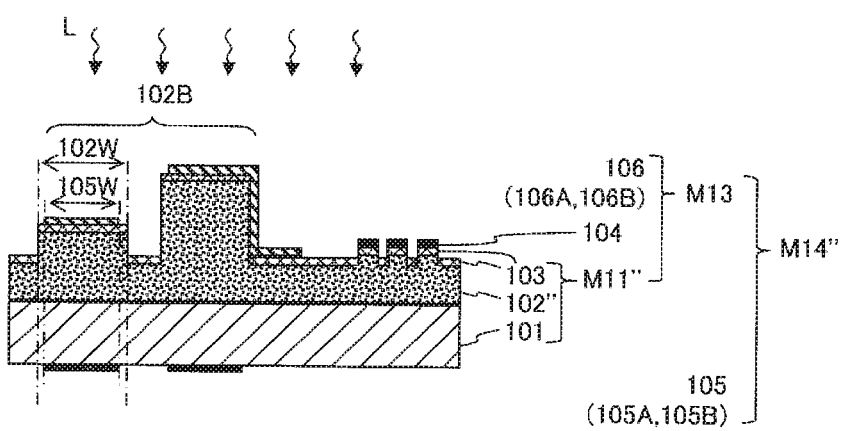

Through this first expansion step S34, a portion 102A, where the electromagnetic wave thermal conversion material in the first electromagnetic wave thermal conversion material layer 104 is formed, of the expansion layer 102' in the processing medium M14' expands, to obtain a desired structure M14" depicted in FIG. 14D.

In the structure forming method according to the third embodiment described above, printing is performed using an ink in black K not including an electromagnetic wave thermal conversion material for a portion desired to be colored in black or gray of the coloring material layer 106. Thus, a better-looking color tone can be represented than that when black or gray is represented by mixing color inks in three colors, i.e., cyan C, magenta M, and yellow Y, like in the first embodiment. Also, the ink jet printer unit 300 may include only a cartridge storing an ink in black K not including an electromagnetic wave thermal conversion material and need not include a cartridge storing an ink in black K including an electromagnetic wave thermal conversion material for the ink in black K.

Note that in the third embodiment, the second expansion step S33 and the first expansion step S34 may be simultaneously performed, like in the modification to the second embodiment.

Note that although in the above-described third embodiment, the black or gray portion of the coloring material layer 106 does not include an electromagnetic wave thermal conversion material, the black or gray portion of the coloring material layer 106 may include an electromagnetic wave thermal conversion material under a predetermined condition.

That is, if the concentration of the black material in the first electromagnetic wave thermal conversion material layer 104 is lower than the concentration of the black or gray portion of the coloring material layer 106, it can also be said that an effect is relatively small because an expansion amount in the black or gray portion of the coloring material layer 106 is smaller than an expansion amount by the first electromagnetic wave thermal conversion material layer 104.

Accordingly, in the case, even if the black or gray portion of the coloring material layer 106 includes an electromagnetic wave thermal conversion material, a first expansion step S34, described below, may be performed after the coloring material layer 106 is formed.

Also, it can be said that an effect by the black or gray portion of the coloring material layer 106 is relatively small when a formation concentration of a black material in the black or gray portion of the coloring material layer 106 has a smaller value than the concentration of the black material in the first electromagnetic wave thermal conversion material layer 104 and has a value predetermined by a preliminary experiment or the like. Thus, the black or gray portion of the coloring material layer 106 may be formed using a material including an electromagnetic wave thermal conversion material.

The embodiment of the present invention is not limited to the foregoing, and may be deformed, as needed, within the scope of the object of the present invention. Although modifications are specifically illustrated below, the present invention is not limited to only the modifications.

For example, an electromagnetic wave may be irradiated from the side of a first surface of a medium to expand an expansion layer at any time after a first pattern is formed using an electromagnetic wave thermal conversion material on at least the first surface, and a second pattern may be formed using an electromagnetic wave thermal conversion material on a second surface on the opposite side to the first surface of the medium at any time before an electromagnetic wave is irradiated from the side of at least the second surface of the medium to expand the expansion layer.

In this case, electromagnetic waves are respectively irradiated from the side of the first surface and the side of the second surface of the medium to expand the expansion layer.

Although printing is performed based on first pattern forming image data and third pattern forming image data in each of the respective first electromagnetic wave thermal conversion material and coloring material formation steps S11, S21, and S31 in the second embodiment, the modification to the second embodiment, and the third embodiment, printing may be performed based on composite pattern forming image data serving as their composite image data.

This composite image data may include printing control information for causing an ink jet printer unit 300 to perform printing using a black ink droplet in black K in a portion corresponding to the first pattern forming image data, and may include printing control information for causing the ink jet printer unit 300 to perform printing using respective color ink droplets in cyan C, magenta M, and yellow Y in a portion corresponding to the third pattern forming image data.

As a result, in a portion, where a black or gray color is designated, of the third pattern forming image data, printing can be performed using only ink droplets not including an electromagnetic wave thermal conversion material.

Also, in the second embodiment, printing need not be performed for the first surface 11A of the medium after the first expansion step S13 in the second embodiment, after the expansion step S23 in the modification to the second embodiment, and further after the first expansion step S34 in the third embodiment. Thus, in each of the expansion steps S13, S23, and S34, a formation concentration of the electromagnetic wave thermal conversion material in the first electromagnetic wave thermal conversion material layer 104 and an amount of electromagnetic wave energy irradiated thereto may be set, as needed, such that an expansion height exceeds 0.5 mm.

As a result, if a height by which the portion 102A, on the side of the first surface 11A, of the expansion layer 102 in the formed structure M14" has been expanded exceeds 0.5 mm, irregularities of Braille and a contour are more easily grasped when the portion 102A is touched by hand than when the height is 0.5 mm or less.

On the other hand, if the height of the portion 102A of the processing medium M14' obtained in the first expansion step S13 is 0.5 mm or less, a first image and a third image can be additionally formed for the first surface 11A of the processing medium M14' or a second image can be formed for the second surface 11B using a general-purpose printer.

Note that in the first embodiment, when the structure M14" need not be colored, it is needless to say that the coloring material formation step S3 may be omitted.

Also, if the structure M14" need not be colored, formation of the coloring material can be omitted in the respective first electromagnetic wave thermal conversion material and coloring material formation steps S11, S21, and S31 in the second embodiment, the modification to the second embodiment, and the third embodiment.

Also, the ink jet printer unit 300 is an example of a forming unit serving as means for forming the first electromagnetic wave thermal conversion material layer 104, the second electromagnetic wave thermal conversion material layer 105, and the coloring material layer 106, and it is needless to say that al laser printer or the like may be used.

In the case of the laser printer, not an ink in each color but a toner in each color is used as a black material and a coloring material.

Although in each of the above-described embodiments and modifications thereto, the second pattern including the coarser pattern than the first pattern is formed using the electromagnetic wave thermal conversion material in a region, not corresponding to the first pattern, of the second surface 11B, on the opposite side to the side on which the expansion layer 102 is provided, of the medium M11, the second pattern may be formed in a region, corresponding to the first pattern, of the second surface 11B of the medium M11.

Although the embodiments of the present invention have been described above, the present invention includes the invention described in the scope of claims and its equivalent scope.

The invention claimed is:

1. A structure forming method comprising:
   a first step comprising forming a first pattern serving as a fine pattern using an electromagnetic wave thermal conversion material on a first surface, on the side on which an expansion layer which expands by heating is provided, of a medium including the expansion layer and then irradiating an electromagnetic wave toward the electromagnetic wave thermal conversion material to expand a portion, corresponding to the first pattern, of the expansion layer; and
   a second step comprising forming a second pattern including a coarser pattern than the first pattern using an electromagnetic wave thermal conversion material on a second surface, on the opposite side to the side on which the expansion layer is provided, of the medium and then irradiating an electromagnetic wave toward the electromagnetic wave thermal conversion material to expand a portion, corresponding to the second pattern, of the expansion layer.

2. The structure forming method according to claim 1, further comprising a third step comprising forming a third pattern corresponding to an image using a coloring material including an electromagnetic wave thermal conversion material in a region, corresponding to the second pattern, of the first surface of the medium after forming the first pattern in the first step and before expanding a portion corresponding to the second pattern in the second step.

3. The structure forming method according to claim 2, wherein the first pattern is a pattern representing a contour of the third pattern, and the first step includes irradiating the electromagnetic wave from the side of the first surface of the medium, to expand the expansion layer.

4. The structure forming method according to claim 1, further comprising forming a third pattern corresponding to an image using a coloring material not including an electromagnetic wave thermal conversion material in a region, corresponding to the second pattern, of the first surface of the medium at the same time as forming the first pattern.

5. The structure forming method according to claim 1, wherein
   the first step includes irradiating the electromagnetic wave from the side of the first surface of the medium, to expand the expansion layer,
   the second step includes irradiating the electromagnetic wave from the side of the second surface of the medium, to expand the expansion layer, and
   expanding the expansion layer in the first step and expanding the expansion layer in the second step are simultaneously performed.

6. The structure forming method according to claim 1, wherein the first step includes irradiating the electromagnetic wave from the side of the first surface of the medium, to expand the expansion layer, and the second step includes irradiating the electromagnetic wave from the side of the second surface of the medium, to expand the expansion layer, and expanding the expansion layer in the second step is performed before expanding the expansion layer in the first step.

7. The structure forming method according to claim 1, wherein the first pattern is a pattern representing at least one of Braille and a line region, and the first step includes irradiating the electromagnetic wave from the side of the first surface of the medium, to expand the expansion layer.

8. The structure forming method according to claim 1, wherein the second step includes irradiating the electromagnetic wave from the side of the second surface of the medium, to expand the expansion layer.

9. A structure forming apparatus comprising:
   a forming unit which forms an electromagnetic wave thermal conversion material on an expansion layer, which expands by heating, in a medium including the expansion layer;
   an irradiation unit which irradiates an electromagnetic wave toward the electromagnetic wave thermal conversion material, to expand the expansion layer on which the electromagnetic wave thermal conversion material is formed; and
   a control unit which performs a first step of causing the forming unit to form a first pattern serving as a fine pattern using an electromagnetic wave thermal conversion material on a first surface, on the side on which the expansion layer is provided, of the medium and then causing the irradiation unit to expand a portion, corresponding to the first pattern, of the expansion layer, and a second step including causing the forming unit to form a second pattern including a coarser pattern than the first pattern using an electromagnetic wave thermal conversion material on a second surface, on the opposite side to the side on which the expansion layer is provided, of the medium, and then causing the irradiation unit to expand a portion, corresponding to the second pattern, of the expansion layer.

10. The structure forming apparatus according to claim 9, wherein the control unit further performs a third step including forming a third pattern corresponding to an image using a coloring material including an electromagnetic wave thermal conversion material in a region, corresponding to the second pattern, of the first surface of the medium after forming the first pattern in the first step and before expanding a portion corresponding to the second pattern in the second step.

11. The structure forming apparatus according to claim 10, wherein the first pattern is a pattern representing a contour of the third pattern, and the first step includes irradiating the electromagnetic wave from the side of the first surface of the medium, to expand the expansion layer.

12. The structure forming apparatus according to claim 9, wherein the control unit causes the forming unit to form a third pattern corresponding to an image using a coloring material not including an electromagnetic wave thermal conversion material in a region, corresponding to the second pattern, of the first surface of the medium at the same time as forming the first pattern.

13. The structure forming apparatus according to claim 9, wherein the first step includes irradiating the electromagnetic wave from the side of the first surface of the medium, to expand the expansion layer, the second step includes irradiating the electromagnetic wave from the side of the second surface of the medium, to expand the expansion layer, and expanding the expansion layer in the first step and expanding the expansion layer in the second step are simultaneously performed.

14. The structure forming apparatus according to claim 9, wherein the first step includes irradiating the electromagnetic wave from the side of the first surface of the medium, to expand the expansion layer, and the second step includes irradiating the electromagnetic wave from the side of the second surface of the medium, to expand the expansion layer, and expanding the expansion layer in the second step before expanding the expansion layer in the first step.

15. The structure forming apparatus according to claim 9, wherein the first pattern is a pattern representing at least one of Braille and a line region, and the first step includes irradiating the electromagnetic wave from the side of the first surface of the medium, to expand the expansion layer.

16. The structure forming apparatus according to claim 9, wherein the second step includes irradiating the electromagnetic wave from the side of the second surface of the medium, to expand the expansion layer.

17. A non-transitory computer-readable storage medium having a structure forming program stored thereon for controlling a structure forming apparatus comprising a forming unit which forms an electromagnetic wave thermal conversion material on an expansion layer, which expands by heating, in a medium including the expansion layer, an irradiation unit which irradiates an electromagnetic wave toward the electromagnetic wave thermal conversion material, to expand the expansion layer on which the electromagnetic wave thermal conversion material is formed, wherein the structure forming program is executable by a computer to perform:

a first step including causing the forming unit to form a first pattern serving as a fine pattern using an electromagnetic wave thermal conversion material on a first surface, on the side on which the expansion layer is provided, of the medium, and then causing the irradiation unit to expand a portion, corresponding to the first pattern, of the expansion layer, and a second step including causing the forming unit to form a second pattern including a coarser pattern than the first pattern using an electromagnetic wave thermal conversion material on a second surface, on the opposite side to the side on which the expansion layer is provided, of the medium, and then causing the irradiation unit to expand a portion, corresponding to the second pattern, of the expansion layer.

18. A structure forming processing medium comprising an expansion layer which expands by heating, wherein an electromagnetic wave thermal conversion material is formed in a first pattern serving as a fine pattern on a first surface, on the side on which the expansion layer is provided, of the medium, and a thickness of a portion, corresponding to the first pattern, of the expansion layer is larger than a thickness of a remaining portion of the expansion layer, wherein an electromagnetic wave thermal conversion material is formed in a second pattern including a coarser pattern than the first pattern on a second surface, on the opposite side to the side on which the expansion layer is provided, of the medium, and a thickness of a portion, corresponding to only the second pattern, of the expansion layer is smaller than a thickness of a portion corresponding to the first pattern.

* * * * *